(12) United States Patent
Bereznyi et al.

(10) Patent No.: US 6,449,695 B1
(45) Date of Patent: Sep. 10, 2002

(54) DATA CACHE USING PLURAL LISTS TO INDICATE SEQUENCE OF DATA STORAGE

(75) Inventors: Alexandre Bereznyi, Kirkland; Sanjeev Katariya, Issaquah, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/321,301

(22) Filed: May 27, 1999

(51) Int. Cl.$^7$ ............................................... G06F 12/12
(52) U.S. Cl. ...................... 711/134; 711/133; 711/136; 711/144
(58) Field of Search ................................ 711/118, 129, 711/130, 132, 133, 134, 136, 144

(56) References Cited

U.S. PATENT DOCUMENTS

| | | | |
|---|---|---|---|
| 5,060,144 A | * 10/1991 | Sipple et al. | 710/200 |
| 5,287,508 A | * 2/1994 | Hejna, Jr. et al. | 709/102 |
| 5,802,568 A | * 9/1998 | Csoppenszky | 711/136 |
| 5,829,051 A | * 10/1998 | Steely, Jr. et al. | 711/216 |
| 5,845,308 A | * 12/1998 | Dockser | 711/3 |
| 6,000,006 A | * 12/1999 | Bruce et al. | 711/103 |
| 6,006,312 A | * 12/1999 | Kohn et al. | 711/210 |
| 6,243,794 B1 | * 6/2001 | Casamatta | 711/153 |

* cited by examiner

*Primary Examiner*—B. James Peikari
(74) *Attorney, Agent, or Firm*—Woodcock Washburn LLP

(57) ABSTRACT

A cache system controls the insertion and deletion of data items using a plurality of utilization lists. When a data item is stored within the data cache, a corresponding data pointer, or other indicator, is stored within the utilization list in a manner indicative of the sequence in which data items were stored in the data cache. When a data item is subsequently retrieved from the data cache, the corresponding data pointer may be altered or moved to indicate that the data item has recently been retrieved. The data pointers corresponding to data items that have never been retrieved will indicate the sequence with which the data items were stored in the cache such that data items may be identified as least recently used (LRU) data items. The data pointers corresponding to data items that have been retrieved provide an indication of the sequence with which the data items have been retrieved such that the most recently retrieved data item is considered the most recently used (MRU) data item. The system controls the deletion of data items from the cache by deleting the LRU data items. A large number of utilization lists may operate independently to accommodate a large number of users. An entry pointer selects one of the utilization lists to store the data pointer corresponding to a data item stored within the cache. A deletion pointer selects one of the utilization lists. The system deletes the LRU data item based on the utilization list currently selected by the deletion pointer.

45 Claims, 18 Drawing Sheets

DATA CACHE USING PLURAL LISTS TO INDICATE SEQUENCE OF DATA STORAGE

TECHNICAL FIELD

The present invention is related generally to a data cache and, more particularly, to a distributed data cache whose file storage can be controlled in accordance with a record expiration model.

BACKGROUND OF THE INVENTION

A data cache is a well-known tool for the temporary storage of data. Typically, the data is downloaded from a data source into the data cache and temporarily saved for subsequent use thereby avoiding the need to download the data again from the data source. For example, a data cache may be used for the temporary storage of data downloaded from an Internet web site. In this example, a computer, such as a conventional personal computer (PC) executes a web browser application program. Data may be downloaded from a web site for display on the PC. The data is stored in a data cache within the PC for subsequent display on the PC so as to avoid having to access the web site a second time to download the same data. The data caching process greatly enhances the speed of operation by eliminating the need to download data a second time.

Computers, such as a PC, workstation, or the like, are frequently connected to other computers to form a computer network. Each portion of the computer network may include its own data cache as an integral part of an application program(s) that may be executing on the particular computer. Unfortunately, these data caches are accessible only through the particular application programs being executed on each computer and are not available for use by other portions of the computer network.

Therefore, it can be appreciated that there is a significant need for a distributed data cache having a general form that can be accessible by any portion of the computer network. The present invention provides this and other advantages, as will be apparent from the following detailed description and accompanying figures.

SUMMARY OF THE INVENTION

A distributed cache system may comprise a local cache and an array of remote caches. The cache itself may be implemented using any suitable data structure for storing and retrieving data items. A cache controller associated with each cache independently controls the operation of its respective cache. In one implementation, a first data structure is used to implement a data cache and store data in association with the first computer (which may sometimes be characterized herein as a computer platform or computers system). A plurality of remote computers are separate from the first computer and are coupled to the first computer. Each of the remote has an associated data structure to store data. Each of the data structures has an associated first utilization list that contains data corresponding to data items stored within the respective data structure. The first utilization list indicates a sequence in which the data items were stored within the respective data structure.

The first data structure and each of the remote data structures each have an associated second utilization list containing data corresponding to data items stored within the respective data structure. The second utilization list contains data indicating a sequence in which data items were retrieved from the respective data structure wherein utilization data in the second utilization list is removed from the first utilization list. Thus, the first utilization list for each data structure contains data indicating the sequence in which data items were stored in the associated data structure while the second utilization list contains data indicative of a sequence in which data items were retrieved from the associated data structure. The first data structure and each of the remote data structures each have an associated cache controller to delete data items from the respective cache.

In one embodiment, the cache controller deletes data items from the respective data structures based on the first and second utilization lists associated with the respective data structure. For example, the cache controller will remove data items from a respective data structure based on the first utilization list by deleting a data item corresponding to utilization data indicating that the data item was the oldest stored item within the first utilization list. If no data is within the first utilization list, the cache controller may delete a least recently used (LRU) data item based on the utilization data within the second utilization list.

In another embodiment, a data structure may have a plurality of first utilization lists associated therewith. The data in each of the plurality of first utilization lists corresponds to a portion of the data items stored within the data structure and is further indicative of a sequence with which the portion of corresponding data items were stored within the data structure.

A first indicator is used to select one of the plurality of first utilization lists that will store the data corresponding to the data items stored within the data structure. A second indicator is used to select one of the plurality of first utilization lists. A cache controller associated with the data structure can delete data items from the data structure. The cache controller will delete a data item based on data contained within the one of the plurality of first utilization lists selected by the second indicator.

In an exemplary embodiment, the first indicator is altered after a data item is stored within the data structure to select a different one of a plurality of first utilization lists. Similarly, the second indicator may be altered following the deletion of data from the data structure to select a different one of the plurality of first utilization lists. In one embodiment, the first and second indicators select different selected ones of the plurality of first utilization lists.

DETAILED DESCRIPTION OF THE INVENTION

The present invention is directed to an innovative data cache that may be readily accessed by any application program. The data cache is implemented by a set of data structures contained within an application programming interface (API). Conventional data caches are created as an integral part of an application program and have a data structure that is customized for that particular application program. In contrast, the data cache of the present invention has a generic data structure that can store virtually any form of data and is thus content insensitive. The universal data cache may be used by one or more application programs without requiring special formatting for storage in the data cache. Data structures and configuration data for the data cache are provided below. The use of universal data structures in the API allow application programmers to define the data cache in general terms and to access the data cache using the defined data structures within the API. The data cache may be readily implemented on a computer network and may be dynamically resized as remote servers are added or removed from the network. As will be discussed in detail below, the distributed data cache system can be configured to accommodate virtually any network topology.

In addition, as will be discussed in greater detail below, the defined data structures of the APIs, allow great flexibility in data cache access. In one form, a single data cache may be accessed by a single client and a single server. However, the flexible configuration of the present invention allows multiple clients to access a single data cache or a single client to access multiple data caches. Similarly a single data cache may be utilized by a plurality of servers or a single server may utilize a plurality of data caches. The data structure of the APIs simplify the programming process by creating a uniform data structure to access data within a data cache.

Figure 1:
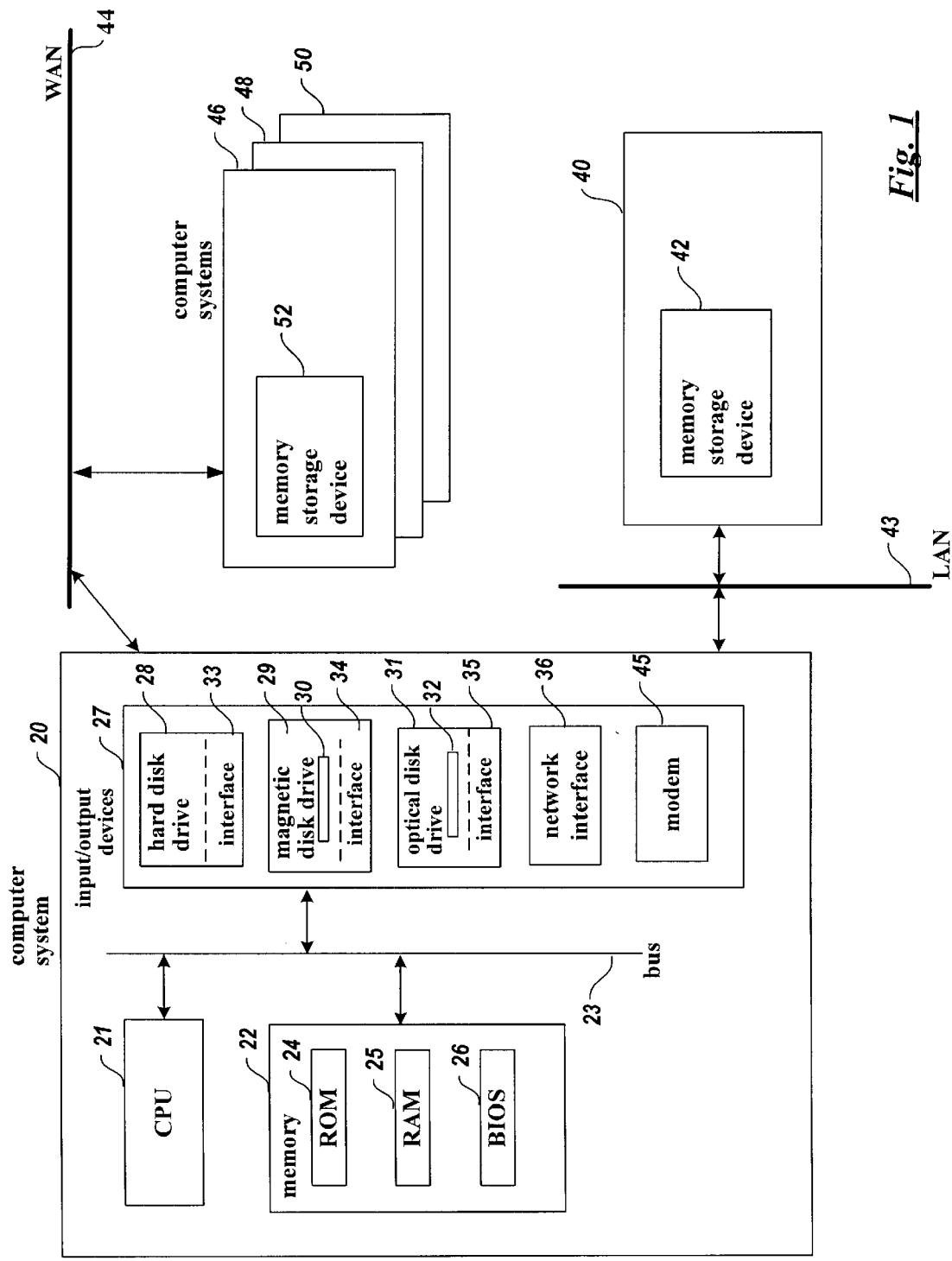
FIG. 1 illustrates a computer system that includes components to implement the system of the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output system 26 (BIOS), containing the basic routines that helps to transfer information between elements within the personal computer 20, such as during start-up, may be stored in ROM 24.

The personal computer 20 further includes input/output devices 27, such as a hard disk drive 28 for reading from and writing to a hard disk, not shown, a magnetic disk drive 29 for reading from or writing to a removable magnetic disk 30, and an optical disk drive 31 for reading from or writing to a removable optical disk 32 such as a CD ROM or other optical media. The hard disk drive 28, magnetic disk drive 29, and optical disk drive 31 are connected to the system bus 23 by a hard disk drive interface 33, a magnetic disk drive interface 34, and an optical drive interface 35, respectively. The drives and their associated computer-readable media provide nonvolatile storage of computer readable instructions, data structures, program modules and other data for the personal computer 20. Although the exemplary environment described herein employs a hard disk, a removable magnetic disk 30 and a removable optical disk 32, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment. Other I/o devices 27, such as a display, keyboard, mouse, joystick, sound board, speakers, and the like may be included in the personal computer 20. For the sake of brevity, these components are not illustrated in FIG. 1.

The personal computer 20 may also include a network interface 36 to permit operation in a networked environment using logical connections to one or more remote computers, such as a remote computer 40. The remote computer 40 may be another personal computer, a server, a router, a network PC, a peer device or other common network node, and typically includes many or all of the elements described above relative to the personal computer 20, although only a memory storage device 42 has been illustrated in FIG. 1. The logical connections depicted in FIG. 1 include a local area network (LAN) 43 and a wide area network (WAN) 44. Such networking environments are commonplace in offices, enterprise-wide computer networks, intranets and the Internet.

When used in a LAN networking environment, the personal computer 20 is connected to the LAN 43 through the network interface 36. When used in a WAN networking environment, the personal computer 20 typically includes a modem 45 or other means for establishing communications over the wide area network 44, such as the Internet. The modem 45, which may be internal or external, permits communication with remote computers 46–50. In a networked environment, program modules depicted relative to the personal computer 20, or portions thereof, may be stored in the remote memory storage device 42 via the LAN 51 or stored in a remote memory storage device 52 via the WAN 44. It will be appreciated that the network connections shown are exemplary and other means of establishing a communications link between the computers may be used.

Figure 2:
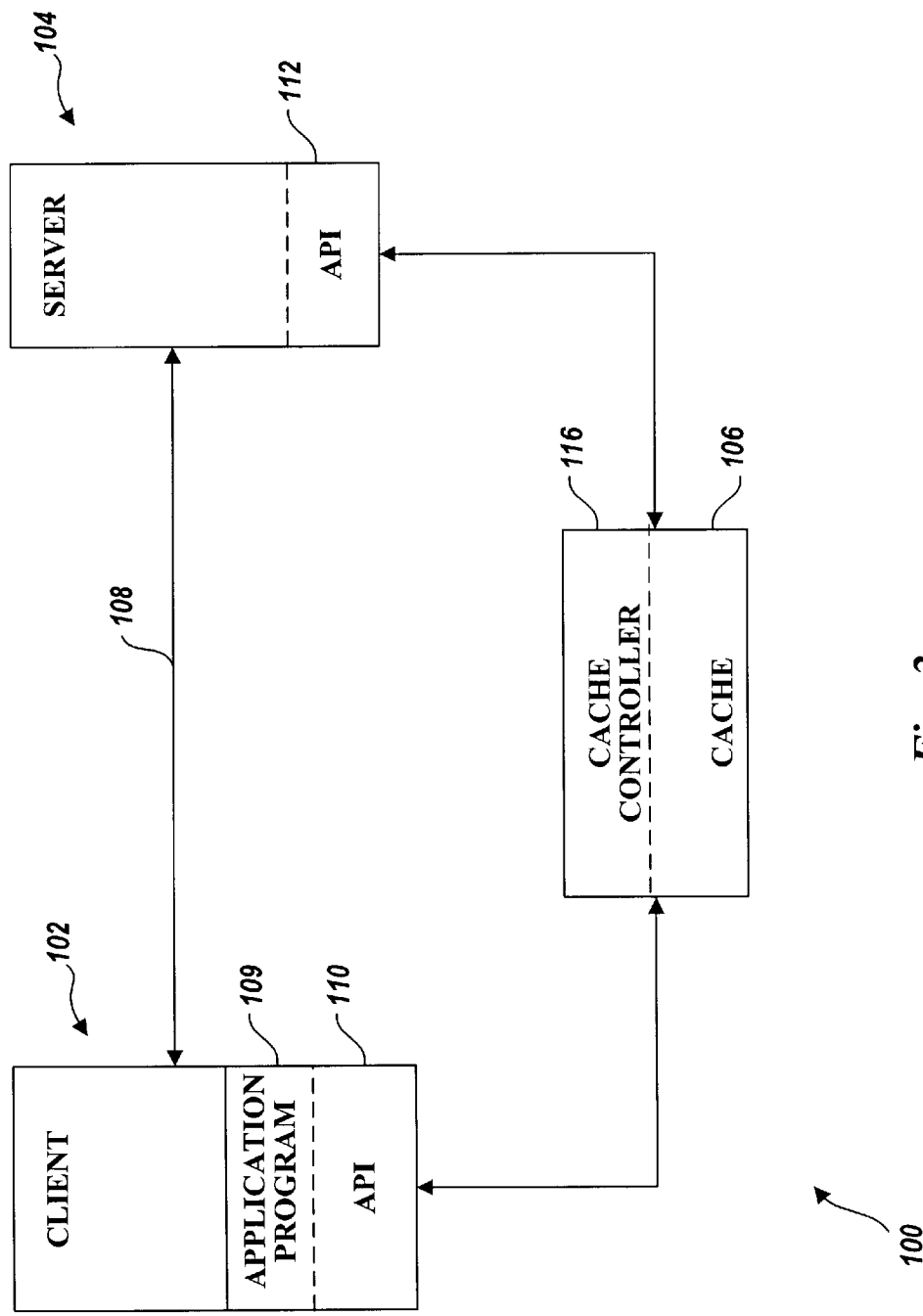
FIG. 2 is a functional block diagram illustrating the use of the present invention in a client-server environment.

The present invention may be embodied in a system 100 illustrated in the functional block diagram of FIG. 2. FIG. 2 illustrates a simplified client-server architecture environment in which a client 102 is coupled to a server 104 via a cache 106. The client 102 is also coupled directly to the server 104 via a network connection 108. The interaction between the client 102 and the server 104 via the network connection 108 is well within the knowledge of those skilled in the art and need not be described in greater detail herein.

In an exemplary embodiment of FIG. 2, the cache 106 is a class of objects that may be automatically defined within the registry or manually defined within an application program. The cache 106 may be a local cache that is present in the client 102 or a remote cache that is implemented on another computing system and coupled to the client. Once the cache 106 has been defined, it may be readily accessed using a class of data structures that comprise a plurality of APIs. In the example of FIG. 2, the client 102 is executing an application program 109 that utilizes an API 110. As will be discussed in detail below, the API 110 is actually a series of APIs that interact with and control the cache 106. For the sake of convenience, the various APIs are described generally as the API 110. Examples of the data structures of the API 110 are provided below. The API 110 provides standardized data structures for accessing the cache 106 to store data, retrieve data or delete data. Similarly, the server 104 includes an API 112 to control access to the cache 106. In an exemplary embodiment, the API 110 and the API 112 utilize identical data structures to access and control the cache 106. By creating a standardized set of structures for the API 110 and the API 112, the system 100 offers access to the cache 106 by any application program and can store data of any form.

The cache 106 also includes a cache controller 116, which functions to identify the precise location of requested data within the cache, identify when the requested data is not in the cache (and therefore must be retrieved from the server 104), and other housekeeping functions, as will be described in greater detail below.

Figure 3:
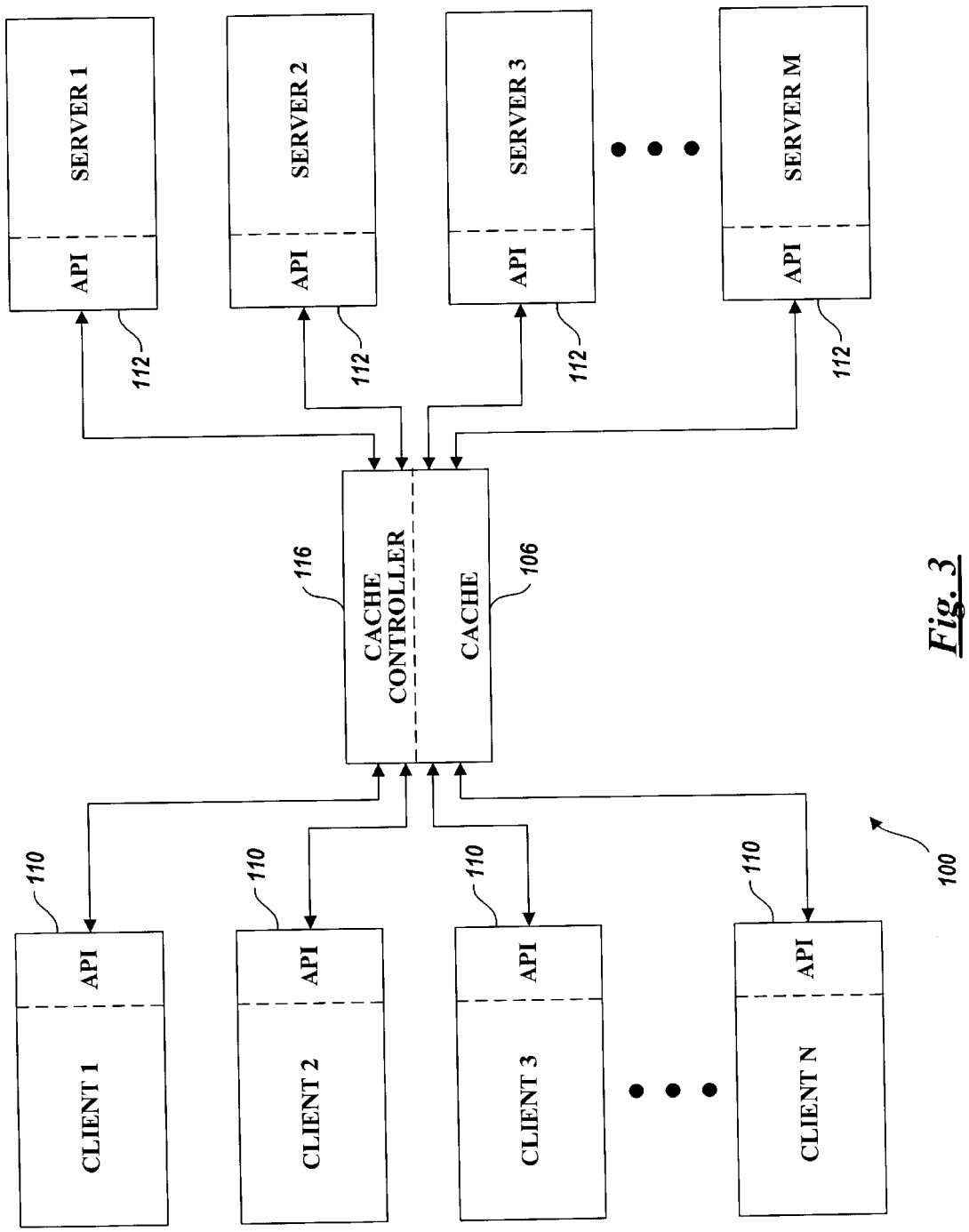
FIG. 3 is illustrates the operation of a single data cache by multiple clients and multiple servers in a client-server environment.

As previously discussed, one advantage of the system 100 is its flexible architecture. This is illustrated in FIG. 3 where, the cache 106 is accessed by a plurality of clients and a plurality of servers in a multiple client-server environment. As illustrated in FIG. 3, clients 1-N each have access to the cache 106 via its respective API 110. As noted above, the APIs 110 each use common data structures thereby simplifying the programming process and permitting multiple application programs to access the same cache 106. The clients 1-N may each be executing different application programs and still utilize the same cache 106 via the respective API 110. The cache 106 may be implemented on one of the clients 1-N or may be implemented on a remote computing system. As will be described in greater detail below, the system 100 may implement a cache on each of the clients 1-N and a cache on each of a plurality of servers 1-M. The cache on any given client (e.g., the client 1) is considered a local cache from the perspective of the client, while caches on the other clients (e.g., the clients 2-N) and the caches on the servers 1-M are considered remote caches from the perspective of the particular client.

The servers 1-M each access the cache 106 via a respective API 112. As noted above, in an exemplary embodiment, the API 110 and the API 112 utilize identical data structures. With the architecture illustrated in FIG. 3, the servers 1-M are each content providers that provide data to the cache 106. Initially, data may not be present within the cache 106. Therefore, a request for data may be made by one of the clients 1-N and result in no retrieval of data from the cache 106. Instead, the request for a particular data item is routed to one of the servers 1-M, which functions as a data source (i.e., the content provider) and puts the requested data item in the cache 106. The client requesting the data item subsequently retrieves the data item from the cache 106. The client may subsequently retrieve the data item directly from the cache 106 without requiring further data retrieval from the server. In addition, other clients may also request the same data item from the cache 106. That is, the initial data request may be made by the client 1, for example. A subsequent request for the identical data item may be made by another client, such as the client 3. Thus, the flexible architecture of the system 100 allows a single cache to be accessed by multiple clients and multiple servers.

Figure 4:
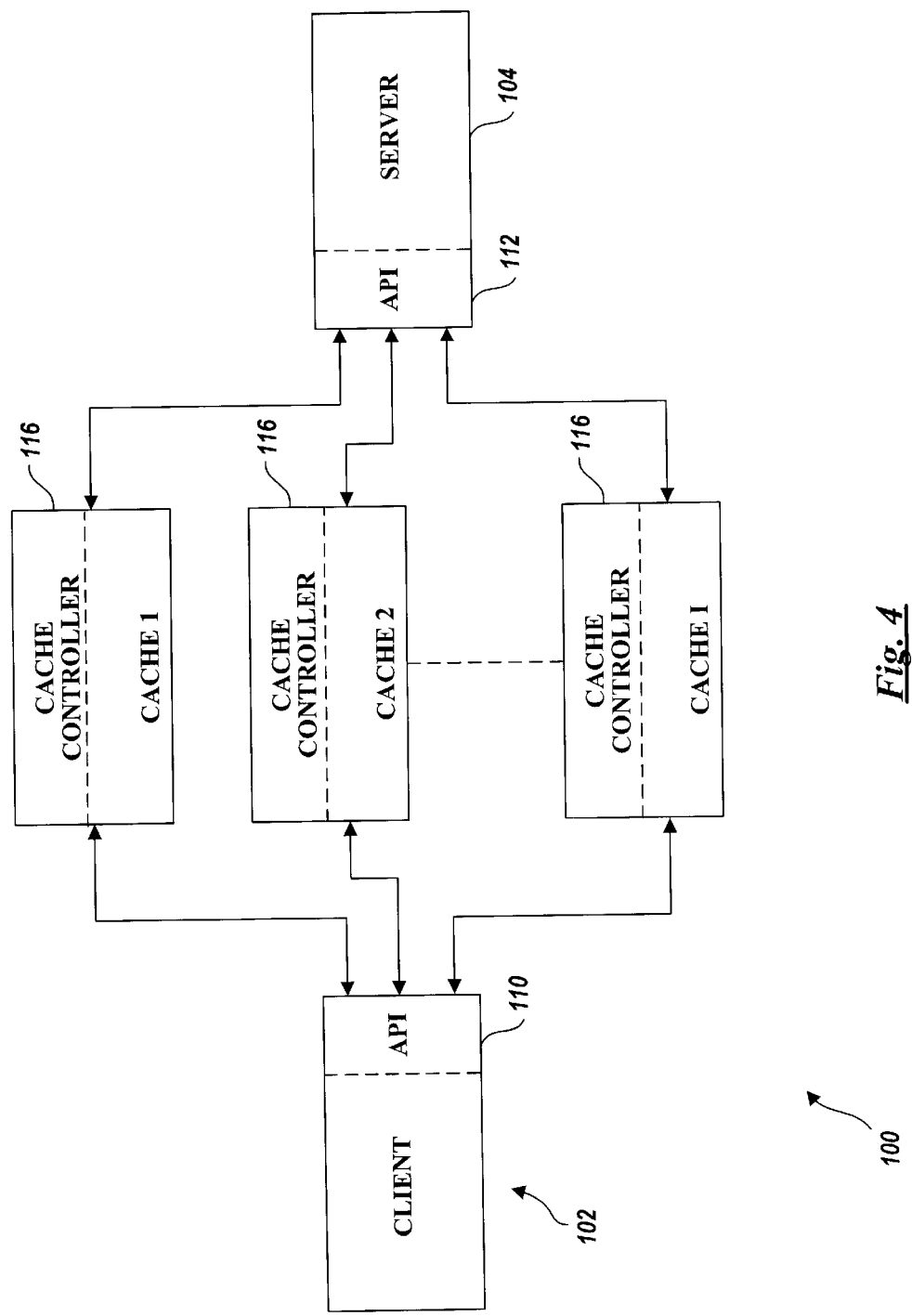
FIG. 4 illustrates the operation of multiple data caches with a single client and a single server.

In another alternative architecture, illustrated in FIG. 4, the client 102 accesses a plurality of caches 1-I via the API 110. Similarly, the server 104 accesses the plurality of caches 1-I via the API 112. Although FIG. 4 illustrates only one client and one server, those skilled in the art can appreciate that the system 100 is flexible enough to accommodate multiple clients and multiple servers in addition to multiple caches. For example, the caches 1-I are typically implemented on an array of remote servers that each contain one data cache. The API 110 of any of the clients 1-N (see FIG. 3) can request data from any of the caches 1-I shown in FIG. 4. Similarly, any of the servers 1-M in FIG. 3 can access any of the caches 1-I of FIG. 4. The data structure of the API 110 and 112 can be used to specify a particular cache 1-I. As will be discussed in greater detail below, the caches 1-I can be local caches, contained within the computer system of the client 102. Alternatively, one or more of the caches 1-I may be remote data caches implemented on other computer systems.

For maximum operating efficiency, each cache includes its own cache controller 116 to identify the precise location of data within the respective cache and to perform other housekeeping functions. The operation of the cache controller 116 will be described in greater detail below.

Figure 5:
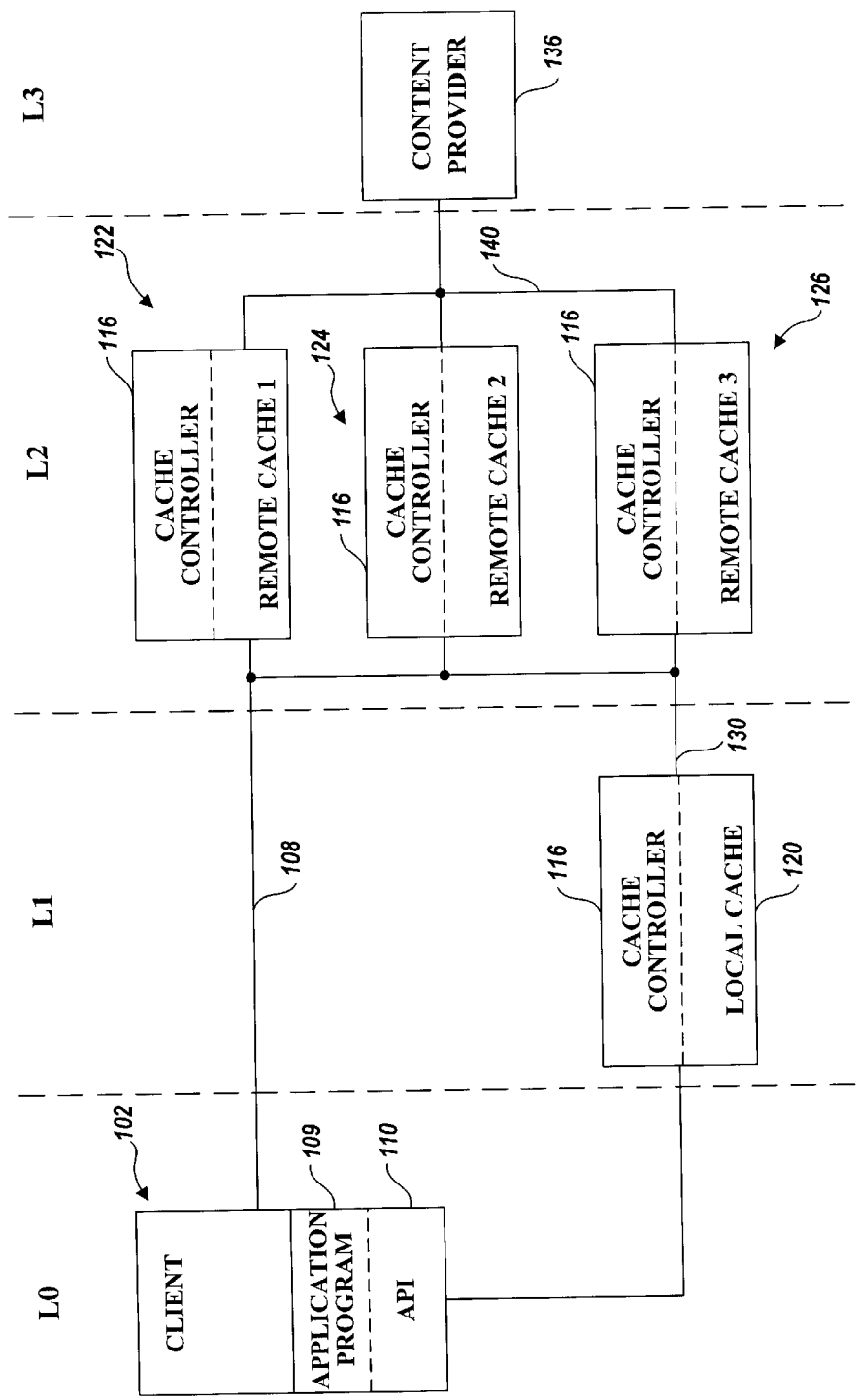
FIG. 5 illustrates the operation of a layered cache hierarchy used by the present invention.

With the use of multiple caches, the system 100 advantageously permits distributed caching, as illustrated in FIG. 5. Distributed caching allows the balancing of work among the various caches. The caches need not be the same size. The client 102 is typically implemented within a computer, such as a personal computer (PC) or computer workstation. The hardware components of the PC, such as a central processing unit, memory, hard disk, keyboard, mouse, and the like are well-known components that need not be described herein. A local cache 120 is located locally within the PC and may be implemented using the PC memory, such as random access memory (RAM), or in non-volatile storage, such as a hard disk, R/W CD-ROM, optical disk, or the like. The present invention is not limited by the specific form of storage used for the local cache 120.

FIG. 5 illustrates only a single local cache 120. Although the system 100 can support multiple instances of the local cache 120, those skilled in the art will appreciate that multiple local caches are unnecessary and utilize extra memory and processor cycles. For example, if the local cache 120 were divided into two caches of equal size, additional memory would be required for storage of indices and the like. In addition, extra processor cycles would be required for maintenance functions of the two caches. Thus, there is no operational advantage to multiple local caches. In contrast, the system 100 advantageously supports the use of an array of remote caches to form a distributed cache network.

In addition to the local cache 120, the system 100 may include a plurality of remote caches, which are typically implemented on one or more computers other than the PC that implements the client 102. In the example of FIG. 5, the system 100 includes a remote server 122, a remote server 124, and a remote server 126, which contain remote caches 1–3, respectively. The remote servers 122–126 are accessible through conventional means, such as a network connection 130 with the local cache 120. The client 102 may access the remote caches 1–3 directly via the network connection 108. The network connections 108 and 130 are illustrated as separate components in FIG. 5 to illustrate the flow of data between the client 102, the local cache 120 and the remote caches 1–3. However, those skilled in the art will recognize that the network connection 108 and the network connection 130 provide the same communication capability and can be implemented with a single transport layer, such as a network interface (not shown).

The remote servers 122–126 perform the function of servers if they provide data to the client 102 directly or via the local cache 120. It should be noted that the application program 109 may itself be the original source of data stored in either the local cache 120 or any of the remote caches 1–3. If a particular data item requested by the client is not contained within the local cache 120, the request for the data item is routed to the remote servers 122–126. If the requested data item is not contained within any of the remote caches 1–3, the request for the data item is passed on to a content provider 136, such as, by way of example, an Internet web site. The remote servers 122–126 may access the content provider 136 via conventional means, such as a network connection 140. As those skilled in the art can appreciate, the network connection 140 may be identical to the network connection 130 if the remote servers 122–126 and the content provider 136 are all accessible via the same computer network, such as the Internet. Although the system 100 may be described in terms of network connections via the Internet; those skilled in the art will appreciate that the principles of the present invention are readily applicable to any form of computer network. The present invention is not limited by the specific architecture or type of network connection used to communicate between the client 102 and the various data caches.

The system 100 may be readily implemented on any computer hardware utilizing various operating systems. The examples presented herein may be directly implemented on an operating system, such as WINDOWS 98, WINDOWS 2000, WINDOWS NT, or the like. Based on the examples presented herein, the principles of the present invention may be readily extended to other operating systems.

In an object-oriented implementation, the system 100 includes cache classes designated as CCache, which is a cache manager and implements the functions of the cache controller 116, CLocalCache, to implement the local cache 120, and CRemoteCache, to communicate with the remote servers 122–126. The remote caches 1–3 may typically be implemented in RAM on the remote servers 122–126, respectively. Each remote server 122-124 also implements the CCache and the CLocalCache classes to control the remote caches 1–3, respectively. In addition, the system 100 includes a standalone cache class designated as CPtrCache, which stores pointers to the user's structures/classes.

It should be noted that the remote servers 122–126 and their respective remote caches 1–3 are "remote" from the perspective of the client 102 and the local cache 120. The client 102 implements the CRemoteCache class to communicate with servers, such as the remote servers 122–126. However, each of the remote servers 122–126 implements the CCache class to perform the functions of the cache controller 116 and the CLocalCache class to control communications with their respective remote caches 1–3. Thus, from the perspective of a remote server (e.g., the remote server 122) its cache (e.g., the remote cache 1) is a "local" cache. The remote servers 122–126 typically contain only one physical data structure (e.g., RAM) that functions as a data cache and uses the CLocalCache class to control that data structure and the CRemoteCache class to communicate with data caches remote to that server.

The main cache class is CCache, which is responsible for managing the local cache, one or more remote cache servers, and all data that flows between them. Each of the classes above has several methods or commands, comprising an Init( ) command, which is called one time to construct a class and configure the system 100, a Put( ) command to store an item in the local cache 120 or one of the remote caches 1–3, a Get( ) command to retrieve an item from the local cache or one of the remote caches, and a Del( ) command to forcibly destroy an item already stored in the local cache or one of the remote caches. The Del( ) command may not be required for all applications. In addition, the CCache also includes an AddRemoteCaches( ) command to add one or more remote caches to the system 100 and a RemoveRemoteCaches( ) command to remove one or more remote caches from the system. As will be described in detail below, the system 100 can accommodate dynamic addition and removal of remote caches without requiring the initialization of the entire system. This allows flexible cache topology that may be varied to accommodate growth in the system by adding additional remote caches and recovery from faults, such as a hardware failure of a remote cache, by removing that cache. The dynamic resizing process will be described in detail below.

The CCache is an object used by the application to do all caching. The CCache has all the commands described above. That is, the CCache can perform Init( ), Put( ), Get( ), and Del( ) commands. The behavior of each command is controlled by various caching parameters and flags that may be set at the time of cache creation in the Init( ) command. Some of the parameters and flags may be dynamically altered during cache operation, either locally by the application program 109 or through other cache monitoring operations.

The CLocalCache is a class object for storing and retrieving cached items on the local cache 120. As noted above, the remote servers 122–126 also implement the CLocalCache object to store and retrieve cached items on their respective remote caches 1–3. The CLocalCache class contains CData objects to store data, which may be referred to as "data blobs," and a means to store and retrieve data blobs associated with unique keys. The term data blob is intended to convey the concept that the specific form of the data is unimportant to satisfactory operation of the system 100. Indeed, the advantage of the data cache of the present invention is that it can store data of any form without regard to the specific data content or structure. Hence, the stored data items may be referred to simply as data blobs. The storage and retrieval of data blobs is performed with the Get( ) and Put( ) commands. A cache table index with pointers are used to generate a unique key for each stored data item (i.e., data blobs). The instances of CLocalCache class reside in the local cache 120 on the user machine and on each of the remote servers 122–126.

The CData objects is an abstraction layer for the efficient storage of data blobs. The CData objects may use any. conventional file system structure. One example of such a structure is HeapAlloc( ) in WIN 32. Numerous conventional techniques for storing data within a database are well known in the art. Any of these techniques may be used to implement the CData objects. The system 100 is not limited by any particular data structure used to store the data blobs. The CData objects have a portion of RAM allocated at the cache initialization (i.e., the Init( ) command). The allocated RAM is conveniently divided into a number of small pages used to store data blobs. In an exemplary embodiment, the allocated RAM portion may be divided into a series of small pages, such as 128–512 bytes to minimize memory use while also avoiding the need to compact data periodically.

The data blob is located in the cache (e.g., the local cache 120 or any of the remote caches 1–3) by its first page number. Multiple pages for large data blobs may be chained together using the last bytes of one page as the index of the next page (if any). For efficient memory use, multiple block pools with different block sizes may be used and all data blobs may be compressed using conventional data compression techniques. In addition to storing a pointer to the first page of the data blobs, the index may keep a list, such as a bit vector, of free and used pages in the cache.

The CRemoteCache class is used to communicate with data caches on one or more remote servers 122–126. FIG. 5 illustrates the remote servers 122–126. As noted above, each remote cache is considered "remote" with respect to the client 102 and the local cache 120. Those skilled in the art can appreciate that each of the remote servers 122–126 may also be considered a client with respect to the content provider 136. In a typical implementation, the remote caches 1–3 are implemented on computers, such as PCs, that are connected together via the network connection 130 or the network connection 140. Each of the remote servers 122–126 also implements an instance of the CCache and the CLocalCache to control operation of the remote caches 1–3, respectively. In an exemplary embodiment, the CRemoteCache class may operate asynchronously so as to permit the client 102 to process other threads while awaiting the retrieval of data from the remote cache.

All communications with the remote caches 122–126 may be wrapped in a CMsgPort class, which can send and receive commands to and from the cache server. The CRemoteCache class contains one CMsgPort class for each server it is using and may optionally specify a FailBack server. The CMsgPort class may be readily implemented using conventional network communication protocols. Thus, the CRemoteCache class simply functions as a middleman used by the CCache to access a server. The CRemoteCache can also use a pair of servers, with each server functioning as the FailBack for the other if the FailBack feature is implemented. A FailBack server is a remote server that functions as a backup in the event of a failure in the primary server or a failure in one of the remote caches. The use of a FailBack server involves redundant data stored in two or more of the remote caches 1–3. Fault-tolerant operation of the system and the use of FailBack servers is discussed below.

The exemplary embodiment of CCache described herein uses the classes and methods as described above. As previously noted, the Init( ) command is used to initially create the local cache 120 and the remote caches 1–3. The user, or application program 109, may invoke the Init( ) command with user-specified configuration information. Alternatively, the user may invoke the Init( ) command utilizing default configuration information stored in a data registry. An example of registry configuration information used to configure the local cache 120 is provided below in Table 1.

TABLE 1

Local Cache Configuration

| |
|---|
| Name = REG_SZ (Default name = "LocalCache") |
| Items = REG_DWORD 3000 |
| MaxItems = REG_DWORD 0 |
| MinSpace = REG_DWORD 12 |
| MaxSpace = REG_DWORD 16 |
| MinRefCount = REG_DWORD 1 |
| UseLRU = REG_DWORD 1 |
| TimeLimitArraySize = REG_DWORD 4 |
| TimeLimitArray = REG_MULTI_SZ |
| = "10"\ |
| "1000"\ |
| "1000000"\ |
| "−1" |
| FreqLimitArraySize = REG_DWORD 4 |
| FreqLimitArray = REG_MULTI_SZ |
| = "10"\ |
| "1000"\ |
| "1000000"\ |
| "−1" |

The cache Name is used to identify the local cache 120 for storing and retrieving data. The storage and retrieval process will be discussed in further detail below. The Items value indicates the estimated number of items to be stored within the local cache 120. The MaxItems provides a maximum number of items that can be stored within the local cache 120. If the value for MaxItems is set to zero, there is no cap on the number of items that may be stored in the local cache 120. The MinSpace and MaxSpace values indicate the minimum and maximum data space that will be used by the local cache 120. If the data value for MaxSpace is set to zero, there is no cap on the amount of space used by the local cache 120, which will be limited only by the available physical storage. Thus, if the local cache 120 is implemented within RAM, the size of the local cache is limited only by the available physical RAM. If the data value for MinSpace is set to zero, no data space will be created or used. In this event, all items will be stored in heap memory only and the data value for MaxSpace will be ignored.

The MinRefCount sets a threshold for a one-step insertion process or a two-step insertion process. A one-step insertion process causes the system 100 to store the data item in a cache, either the local cache 120 or one of the remote caches 122–126, the first time the data item is requested by the user.

However, to conserve space within the cache, the user (or the application program 109) may specify that a data item must be requested two or more times before it is actually stored in the cache. The data value for MinRefCount determines how many times a particular data item must be requested before it is actually stored in the cache. If the data value for MinRefCount is greater than one, the system 100 stores a unique key corresponding to the requested data item even though the data item may not be stored within the cache as a data blob. The system 100 increments a request count corresponding to the unique key each time the particular data item is requested. The data item request count is compared with the. MinRefCount and, if it equals or exceeds the MinRefCount, the data item is stored as a data blob within the cache. The MinRefCount may also be subject to time restrictions. For example, a particular data item must be requested at least a predetermined number of times within a predetermined time frame (e.g., a minute, hour, or day). If the data item is not requested the predetermined number of times within the predetermined time frame, the data item will not be stored in cache. The default value for MinRef-Count is "−1," which indicates that a requested data item will be immediately stored in the data cache as a data blob.

As previously noted, the remote servers 122–126 also implement the CCache and CLocalCache classes to control their respective remote caches 1–3. Thus, the local cache configuration information in Table 1 is utilized by each remote server 122–126 to configure its own cache.

Several processes may be employed to eliminate unnecessary data from the cache (either the local cache 120 or the remote caches 1–3). The UseLRU data value may be set to enable the use of a "least recently used" (LRU) list. If the use of the LRU has been enabled, the cache controller 116 will keep a list of least recently used items. If there is insufficient data space in the cache, either the local cache 120 or one of the remote caches 1–3, to store a new data item, the cache controller 116 will free space in the cache by deleting one or more of the LRU items. The operation of the system 100 using the LRU list will be described in greater detail below. As those skilled in the art can appreciate, maintaining LRU lists requires memory space and processor cycles of the PC, which may slow overall data processing. Accordingly, the default is not to use the LRU to speed up operation of the system 100.

In addition, the local cache 120 can use time and/or frequency parameters to delete older or unnecessary items from the cache. The TimeLimitArraySize defines the size of an array to store time limits. The TimeLimitArray stores data associated with each stored data blob to indicate an expiration time, in milliseconds, for each item. For example, a data blob can be stored with a data value of 1000, indicating that the data blob will be stored in the local cache 120 for one second. Of course, other values may be used to store data within the local cache 120 for shorter or longer periods of times. For example, the TimeLimitArray may specify values in seconds, minutes, hours, or even days. A data blob may be stored with a data value of "−1" in the TimeLimitArray to indicate that there is no expiration time limit for that particular data blob. A data item that is stored with no expiration time limit is sometimes referred to as a "sticky" item.

When a data item is stored within the cache (either the local cache 120 or the remote caches 1–3), a store time is associated with the data item. The cache controller 116 checks the item for expiration time when the item is retrieved from the cache. When a data item is retrieved from the cache, the time for which the data item has been stored in the cache is compared with the time limit data in the TimeLimitArray. If the data item has existed in the cache for a period of time greater than the time limit, the data item is expired (i.e., deleted) from the cache by the cache controller 116.

Alternatively, the cache controller 116 may independently execute an internal update thread to check each item for an expiration time. The internal update thread compares the length of time that a data item has been stored in the cache with the time limit data and deletes any data items that have exceeded the time limit. Those skilled in the art can appreciate that the independent execution of an update thread by the cache controller 116 consumes processor cycles. To speed up operation of the cache, execution of the internal update thread is unnecessary unless the cache is nearly full.

In addition to time limit expiration, the cache (either the local cache 120 or any of the remote caches 1–3) may delete a data item based on its frequency of use. The FreqLimitArraySize defines a data structure used to store frequency data for each data item stored within the cache. The FreqLimitArray stores a frequency of use, in milliseconds, for each item stored in the cache. Other time measurements, such as seconds, minutes, hours, etc., may also be used. If a data item is used less frequently than the data in the FreqLimitArray, the item will be deleted from the cache. When a data item is retrieved from the cache, the time that the data item has existed in the cache is divided by the total number of times that the item was used. The resulting average interval between accesses is compared to the frequency limit data stored in the FreqLimitArray for that particular data item. If the resulting average interval between accesses is longer than the frequency limit assigned to the data item, the item is expired (i.e., deleted), from the cache. In this manner, data items that are frequently accessed will be retained within the cache while infrequently used data items will be deleted.

Alternatively, the cache controller 116 may execute an independent internal thread that determines the frequency of use. The independent internal thread calculates the average interval between accesses in the manner described above and compares the average interval time with the frequency limit data in the FreqLimitArray. If the average interval is greater than the frequency limit, the data item is expired (i.e., deleted) from the cache by the cache controller 116. However, those skilled in the art can appreciate that the operation of an independent thread consumes processor cycles that decreases the overall speed of operation of the cache. To speed up operation of the cache, execution of the independent internal thread is unnecessary unless the cache is nearly full.

As noted above, the system 100 may comprise one or more local caches 120 within the PC or one or more remote caches 1–3 at the remote servers 122–126, respectively, and accessed via conventional communication links, such as the network connections 108 or 130. Table 2 below illustrates an example of registry configuration information for use to configure the client 102 to communicate with a remote server.

TABLE 2

| Remote Cache Configuration |
| --- |
| UseFailBackServers = REG_DWORD 1 |
| RemoteCacheNumber = REG_DWORD 2 |
| RemoteCacheList = REG_MULTI_SZ |
|     "server_group_1" |
|     "server_group_2" |
|     "server_group_3" |
| server_group_1 |
|     ServerName = server_1: |
|     FailBackServerName = 123.145.8.45 |

TABLE 2-continued

Remote Cache Configuration server_group_2
    ServerName = 123.145.8.47
    FailBackServerName = 123.145.8.48
server_group_3
    ServerName = remote server 126
    FailBackServerName = none The UseFailBackServers data enables the use of failback servers. As previously described, failback servers designate multiple servers that contain redundant data and allow the failback server to takeover in the event of failure in the primary server. The fault-tolerant operation of the system 100 is discussed below. The RemoteCacheNumber indicates the number of remote caches that are available in the system 100. The RemoteCacheNumber has a data value of zero to indicate that no remote caches are available on the system 100. The RemoteCacheList identifies each remote server that contains a data cache. In the example listed in Table 2, three remote server groups, identified as "server_group_1," "server_group_2," and "server_group_3," are available on the system 100. Additional remote servers may be included simply by identifying them in the RemoteCacheList. The process of dynamically adding or removing data caches from the system 100 will be discussed in detail below. Each remote server is further identified with a ServerName and an optional FailBackServerName. The server name and/or failback server name can be identified by a name, such as "server_1," by its dotted IP-address, such as "123.148.8.45," or other conventional network identifier.

As noted above, some configuration information is optional. The optional configuration information has default values specified in the registry and need not be specified in the cache initialization. The optional configuration data are illustrated below in Table 3.

TABLE 3

Optional Cache Configuration

NoLocalCache = REG_DWORD 1
Name = REG_SZ
NoPerfCounters = REG_DWORD 1
MaxItems = REG_DWORD 0
MaxSpace = REG_DWORD 16
MinRefCount = REG_DWORD 1
UseLRU = REG_DWORD 1
ContentProviders = REG_MULTI_SZ
    "provider1"
    "provider2"

TABLE 3-continued

Optional Cache Configuration provider1 = REG_SZ
    "prova; server=server_1, FailBack=0"
provider2 = REG_SZ
    "provb: server=123.145.8.47, FailBack=0"

Most data elements shown above in Table 3 have already been described with respect to Table 1 or Table 2, and need not be described in any greater detail herein. The cache (i.e., the local cache 120 or any of the remote caches 122–126) may also be configured to accept a content provider dynamic link library (DLL). For example, the optional cache configuration elements illustrated in Table 3 include a content provider identification and data regarding the DLL to be stored in the cache (either the local cache 120 or any of the remote caches 1–3). In the example of Table 3, two content providers, provider1 and provider2, are identified. A DLL, identified in the example of Table 3 as "prova.dll" will be loaded into the cache from provider 1 and a DLL, identified as "provb.dll" will be loaded into the cache from provider 2. The optional string following the identification of the DLL is passed to the provider DLL as a startup parameter. In the example illustrated in Table 3, provider1 is the source of the program prova.dll. The string "server_1" is provided to prova.dll as a startup parameter. Those skilled in the art will recognize that Table 3 merely provides one example configuration for downloading a DLL into the cache. The system 100 is intended to accommodate any conventional techniques for passing starting parameters.

The initialization of the local cache 120 and the remote caches 1–3 using the parameters illustrated in Tables 1–3 are provided as examples of data needed to initialize and configure the cache system 100. However, those skilled in the art will recognize that different parameter values and different types of parameters may also be used. Any additional information required to initialize the cache system 100 is within the scope of knowledge of one skilled in the art, and will not be described in greater detail herein. The registry data information to initialize the local cache 120 and the remote caches 1–3 has been described above. The cache may be created by an application program simply by calling a "Cache Init( )" with no parameters specified. In this event, a cache will be created with the default values specified in the registry. Alternatively, the user can create a cache with configuration parameters so as to allow maximum flexibility in the cache configuration. Table 4 below describes configuration structures that can be used with the Init( ) method to create the local cache 120 and the remote caches 1–3.

TABLE 4

Cache Configuration Structures

| | |
|---|---|
| { | |
| CHAR tcConfigRegRoot [MAX_PATH]; | // Registry root for this cache config |
| | // when this configuration structure is loaded |
| | // from some registry location |
| | // that location is saved in this |
| | // tcConfigRegRoot string for further use |
| BOOL NoLocalCache; | // don't have local cache. use remotes only |
| | // this flag is used to disable local cache |
| | // creation |
| | // in Init() when only remote caches are used |

TABLE 4-continued

Cache Configuration Structures

| | | |
|---|---|---|
| LocalCacheConfig *pLocalCacheConfig; | // | local cache configuration: see local.h |
| | // | array of remote cache configurations: |
| | // | (see remote.h for definition) |
| int nRemote; | // | number of remote caches: 0 means no remote |
| | // | caches |
| RemoteCacheConfig *pRemoteConf; | // | flag to use failback servers in ALL remote |
| | // | caches: |
| BOOL fuseFailBackServers; | | |
| } CacheConfig; | | |
| RemoteCacheConfig structure is described in remote.h. | | |
| LocalCacheConfig structure (see local.h): | | |
| { | | |
| DWORD nHashTableSize; | // | hash table size: about how many items can |
| | // | be stored the intention for this value is // |
| | | to be around the average number of items |
| | // | stored in cache for max performance but |
| | // | it's OK if it's few times bigger of |
| | // | smaller, default is 16K or more |
| | // | CData objects configuration: (see YDC spec. // |
| | | memory use) |
| DWORD nData; | // | number of data objects (need few to lower |
| | // | contention) nData can never be more than |
| | // | MAX_NDATA (even when it grows, so if you |
| | // | start from nData = 32, it can only grow to // |
| | | no more than 256: 8 times |
| | // | if you start from nData = 8, it can only |
| | // | grow 32 times etc. |
| | // | if RAM and dwMaxDataMB (below) permit it |
| DWORD nPage; | // | number of pages per data object |
| DWORD nPageSize; | // | page size for data object |
| | // | the above 3 numbers determine the total |
| | // | data space (i.e., data blob storage). |
| | // | Data space is made of CData objects each of // |
| | | them having npage pages. |
| | // | Multiple CData objects allow lower |
| | // | contention (better performance) in stress |
| | // | conditions (many threads). |
| | // | The number of objects can grow at runtime. |
| | // | The product nData*nPage*nPageSize is the |
| | // | total number of bytes allocated |
| | // | initially for data objects. nData by |
| | // | default is 32. |
| | // | If it is 0 no data objects are created and // |
| | | all data blobs will come from heap. |
| DWORD nHeap; | // | number of heaps to use (lower contention) |
| | // | if USE_MANY_HEAPS is defined as 1 at the |
| | I/ | top of local.h |
| | // | there are that many private heaps used by |
| | // | cache to lower contention in stress |
| | // | conditions (many threads). For big caches |
| | // | 512 heaps make sense. |
| DWORD nMinRef; | // | min RefCount needed to REALLY insert |
| | // | data in Put the default is 1: insert // |
| | | data on the first Put(). |
| | // | 0 will work the same |
| | // | When most of data going into cache is // |
| | | not likely to be used, while some |
| | // | wlll be used many times, setting |
| | // | nMinRef to 2 or more will reduce cache // |
| | | overhead these two arrays let user |
| | // | tell cache to automatically expire |
| | // | items which lived longer |
| | // | than given time and/or have average |
| | // | interval between usages longer than |
| | // | given time (in msec) |
| DWORD nTimeLim; | // | number of expiration time limits |
| DWORD *TimeLim; | // | expiration time limits array |
| DWORD nFreqLim; | // | number of expiration freq limits |
| DWORD *FreqLim; | // | expiration freq limits array |
| DWORD dwMaxDataMB; | // | max data space is allowed to |
| | // | grow to, in Mb if this value is not 0 // it |
| | | will limit the growth of total size // of data |
| | | objects if they are present |
| DWORD dwMaxItems; | // | cap on max entries in the index |
| | // | if this is not 0 this number will |
| | // | limit the number of items in local |
| | // | cache |

TABLE 4-continued

Cache Configuration Structures

| | | |
|---|---|---|
| DWORD dwNoUseTime; | // | No-Use expiration time limit |
| | // | if this value is not 0, it will cause // |
| | | cache to expire all items not accessed // by |
| | | Get() for more than this number of // msec |
| DWORD dwLruUse; | // | LRU lists usage |
| | // | this flag is used to turn on/off LRU |
| | // | mechanism which will delete some |
| | // | Least Recently Used items to free data // |
| | | space when is not available for Put() |
| | // | LRU use is the default selection. but // it |
| | | has 20 // bytes per item plus CPU // |
| | | overhead . . . |
| | // | Cache content save config: |
| DWORD dwSaveKeysOnly; | // | do not save data blobs when saving |
| | // | content when this flag is set |
| | // | Save() will only save keys |
| | // | to disk, no data in order to get fresh // |
| | | content from provider by callback in |
| | // | Load() CHAR szSaveDirList |
| | // | (MAX_SAVE_PATH); |
| | // | list of directories where to save |
| | // | content multiple directories |
| | // | (separated by ";") can be used for two // |
| | | reasons: -- when each directory comes // |
| | | from different SCSI disk/controller |
| | // | the Load/Save is much faster (up to 3 |
| | // | disks per SCSI controller) |
| | // | -- because each directory is serviced // by |
| | | a separate thread, on SMP |
| | // | it's a bit faster - if you have fast |
| | // | disk(s) |
| DWDRD dwNoPerfCounters; | // | do not report perf counters |
| | // | this flag is used to turn off perform // |
| | | counters reporting, including PDH |
| | // | thread default is to have this value |
| | // | as 0 |
| CHAR InstanceName [MAX_CACHE_NAME]; | // | name of this cache instance |
| | // | this is user-given name to it's local // |
| | | cache, used in perform and any |
| | // | other remote monitoring/administration |
| } LocalCacheConfig; | | |
| RemoteCacheConfig structure (see remote.h): | | |
| { | | |
| BOOL fUseFail9 BackServer; | // | if you'll want to use failback server |
| | // | if it is not 0, two servers will be |
| | // | used as one FT (Fault Tolerant) |
| | // | remote cache in a round-robin fashion |
| | // | this flag is normally overridden by |
| | // | CCache which forces all its |
| | // | remote cache to be same about FT |
| CHAR szServerName [MAX_PATH]; | // | main server machine name |
| | // | if fUseFailBackServer is 0 this is the // |
| | | only server used it can be a machine |
| | // | name or dotted IP // address |
| CHAR szFBServerName [MAX_PATH]; | // | failback server machine name |
| | // | if fUseFailBackServer is 0 this is |
| | // | ignored it can be a machine name or |
| | // | dotted IP address |
| DWORD dwPort; | // | TCP/IP port if not default |
| | // | leave it a 0 to use default port |
| | // | CACHE_DEF_PORT (7600) |
| | // | if you want to use another port, run |
| | // | cachesrv -pYOUR_PORT too |
| } RemoteCacheConfig; | | |

The programming comments provided with each of the structural elements listed above in Table 4 provide the user with sufficient details to implement the cache system 100. Those skilled in the art will recognize that other conventional programming techniques may be used to implement the cache system 100. The use of these cache configuration structures need not be discussed in any further detail herein.

Selected commands are common to all classes of caches. The cache, either the local cache 120 or any of the remote caches 1–3, are accessed using a set of CacheQuery instructions. These include a "Put" or store instruction, which inserts new data or overwrites existing data, a "Get" or retrieve instruction which looks up and gets data stored in the cache, and a "Del" or delete instruction, which destroys a valid entry in the cache. As will be described in detail below, the cache query data structure is common for each of these three instructions. Furthermore, in an exemplary embodiment, the same structures are used by the API 110 (see FIG. 2) and the API 112. Thus, the local cache 120 and any of the remote caches 1–3 may be universally accessed and controlled by a set of standardized API structures that may be used at any point throughout the system 100. That is, the system 100 may include the local cache 120, the remote caches 1–3 and various content providers (e.g., the content provider 136 in FIG. 5). The distributed nature of the system 100 and the universal data structure of the APIs allow the efficient use of resources at the local level (e.g., in the local cache 120) and at the remote servers (e.g., the remote caches 1–3). Furthermore, the cache itself has no knowledge of the specific. form of data and simply responds to the common data structures of the CacheQuery instruction.

The configuration of FIG. 5 is intended only to illustrate the distributed nature of the cache system 100 and the ability of one element (e.g., the client 102) to access any of the caches (either the local cache 120 or any of the remote caches 1–3) on the system. Similarly, the remote servers 122–126 may access a content provider (e.g., the content provider 136) or any other cache. For example, the remote server 122 can access the local cache 120 or any of the remote caches 1–3. Access and control of the distributed cache system is simplified by the standardized structure of the APIs.

Table 5 below defines the basic structure for a CacheQuery instruction.

TABLE 5

CacheQuery Structure

```
typedef struct {
// Key
BYTE *key;              // hash key [in]
WORD key_size;          // key size in bytes [in]
// data Blob
BYTE *data;             // item data buffer [in, out]
DWORD data_size;        // item data size [in, out]
DWORD chain_len;        // how long was search chain [out]
// properties and states
DWORD crea_time;        // item creation time by GetTickCount() [in, out]
DWORD times_used;       // number of time item was used since insert [in, out]
BYTE time_type;         // entry property : TIME_LIMIT_TYPE [in,out]
BYTE freq_type;         // entry property: FREQ_LIMIT_TYPE [in,out]
DWORD flags;            // affects how operation is done
DWORD dwTimeout;        // remote call timeout (if not set to 0, else default) . . .
} CacheQuery;
```

The cache query structure includes a key to uniquely identify the data item and a key size data value to indicate the size of the key. The key may be a numerical value, a search string, such as an Internet search request, or the like. The use of such keys is within the scope of knowledge of one skilled in the art and need not be described in detail herein. If data is being retrieved from the cache (e.g., the local cache 120 or any of the remote caches 1–3), the data blob structure specifies a buffer size to accept the data from the cache. The properties and states data structures specify data values to be used in analyzing the time/frequency limits for continued storage of data within the data cache. The cache query structure also includes the number of flags that may be set by the user to provide further operation instructions to the system 100. The flags and their effect on cache operation are discussed in detail below. A time out data value can be set for queries to the remote cache (e.g., any of the remote caches 1–3). If a requested data item is not successfully retrieved within the specified timeout period, the operation may be terminated and an error message generated.

The flags used by the CacheQuery structure are illustrated below in Table 6.

TABLE 6

Cache Query Structure Flags

```
// Delete() Flags
QP_DEL_BY_PREFIX
QP_DEL_BY_PREFIX_WAIT
// Put() Flags
QP_PUT_NO_OVERWRITE
QP_PUT_REPLACE_PROS
QP_PUT_BLOW
// Get() Flags
QP_GET_NO_PROVIDER
QP_GET_NO_DIRECT_PROVIDER
QP_GET_UNLIM_PROVIDER
QP_GET_NO_OLD_MAP
QP_GET_NOSAVE
QP_GET_NOSAVE_L1
QP_GET_NOSAVE_L2
QP_GET_FROM_PROV
QP_GET_NOASK_L2
QP_GET_NODATA
QP_GET_FIRST_KEYS
QP_GET_NEXT_KEYS
QP_GET_ENTRY_PTR
QP_GET_NOT_EXPIRE
// Flags Used For All Queries
```

TABLE 6-continued

Cache Query Structure Flags

```
QP_NO_LOCAL
QP_NO_REMOTE
// Flags For Remote Queries in Asynchronous Mode
QP_ASYNC
QP_ASYNC_NO_REPLY
QP_ASYNC_SEND
QP_ASYNC_RECV
QP_ASYNC_CANCEL
// Flags For Remote Queries
QP_REMOTE_SRV_MAIN
QP_REMOTE_SRV_FB
```

Some of the flags listed above in Table 6 are used for all cache queries. However, most of the flags are unique to specific commands or the status of the system 100. For example, a QP_DEL_BY_PREFIX flag allows the user to delete all entries in the cache (either the local cache 120 or any of the remote caches 1–3) that have a common prefix. For example, if the user wishes to delete all keys that start with the prefix "abc_", the user sets the key to "abc_" with a key size of 4 and calls the Del( ) command with this flag set. If the prefix starts with a "*", all keys in the specified cache will be deleted. The Del( ) command is performed by a separate thread created for it. Thus, the Del( ) will return very quickly while the operation independently analyzes all data keys for the specified cache (e.g., the local cache 120 or any of the remote caches 1–3) and deletes all of the specified keys.

The QP_DEL_BY_PREFIX_WAIT flag causes the system 100 to operate in a manner similar to that above except that the system will wait until the entire analysis operation is complete and the specified keys are deleted before returning.

The QP_PUT_NO_OVERWRITE flag is used during a Put( ) command to prevent the replacement of items already in the cache (either the local cache 120 or any of the remote caches 1–3), without the knowledge of the user or to save time by not replacing sticky data items (i.e., items for which no time limit has been specified). The QP_PUT_REPLACE_PROS flag allows the user to edit a data item's properties by replacing the existing ones specified in the cache query. For example, the user may get a particular data item's properties from the cache and modify them to alter the time and/or frequency limit data and returns the edited properties to the cache. Thus, the data item is unaltered, but its properties have been altered. The QP_PUT_BLOW flag is used to delete all properties and counts to create a data item with no memory about the past. Thus, the data item will have no previous data regarding the reference count number, creation date, or the like.

The QP_NO_PROVIDER flag is set to retrieve data from a cache server (e.g., the remote servers 122–126) but does not allow the remote servers to retrieve data from a content provider which has been previously configured for the cache server (e.g., the content provider 136 in FIG. 5). The QP_GET_NO_DIRECT_PROVIDER flag is set to allow data to be retrieved from a cache (e.g., the local cache 120 or any of the remote caches 1–3) but does not retrieve data from any content providers (e.g., the content provider 136) than have previously been configured for the system 100. The QP_GET_UNLIM_PROVIDER flag may be set to allow the system 100 to retrieve data from any level, including the local cache 120, any of the remote caches 1–3 or any content provider. For example, the local cache 120 may be considered a first cache level (i.e., L1) while the remote caches 1–3 may be considered a second level (i.e., L2). The content provider 136 provides a third level of depth (i.e., L3). The content provider 136 may retrieve data from yet another content provider (not shown) that would comprise yet another level (i.e., L4) of the system 100. The principles of the present invention may be extended to any depth (L5, L6, L7 . . . ). The default value is to search for data only to the L3 level, which corresponds to the content provider 136. However, if the QP_GET_UNLIM_PROVIDER flag is set, the system 100 will search to any depth of providers that have previously been configured.

The system 100 allows the user to dynamically add additional remote caches on the fly by executing an AddRemoteCaches( ) command. The process of adding and removing data caches on the fly is discussed in detail below. If additional remote caches have been added, the system 100 will create a new map of keys to locate data items in the various caches. Under certain circumstances, such as relocating data items from an old cache to the new cache, the new map may not contain data to locate data items that were listed in a previous mapping. The system 100 will examine older maps in an attempt to locate data specified by the Get( ) command. The use of older maps may be disabled by setting the QP_GET_NO_OLD_MAP flag. Setting this flag may result in the loss of some older mapped items, but results in a faster operation of the Get( ) command.

A number of flags may be set by the user to specify various strategies for saving requested data. For example, the QP_GET_NOSAVE flag is set to retrieve a data item, but prevent it from being stored in the next level of cache storage. For example, if the requested data item is found in an L2 layer (e.g., on any of the remote servers 122–126), the data item will be provided to the client 102, but will not be saved in the L1 layer (e.g., the local cache 120). Similarly, setting the QPGET_NOSAVE flag will prevent a data item found in the L3 layer (e.g., the content provider 136) from being stored in the L2 level (e.g., on any of the remote servers 122–126). The QP_GET_NOSAVE_L1 flag is set to prevent storage of an item found in the L2 layer (e.g., on any of the remote servers 122–126) from being stored in the L1 layer (e.g., the local cache 120). Similarly, the QP_GET_NOSAVE_L2 flag is set to prevent the storage of an item found in the L3 layer (e.g., the content provider 136) from being stored in the L2 layer (e.g., on any of the remote servers 122–126). The QP_GET_FROM_PROV flag is set to force the system 100 to bypass the L1 layer (e.g., the local cache 120) and the L2 layer (e.g., the remote servers 122–126) and request data directly from the L3 layer (e.g., the content provider 136). For example, the system 100 may request a DLL directly from the content provider 136.

A QP_GET_NOASK_L2 flag is set to bypass the L2 layer (e.g., the remote servers 122–126) and retrieve directly from the L3 layer (e.g., the content provider 136). The QP_GET_NODATA flag is used to retrieve a data item's properties, but does not retrieve the data itself. This may be used, for example, to retrieve the properties of a data item or to determine if a particular data item exists. It should be noted that execution of the Get( ) command with the QP_GET_NODATA flag set may cause, the system to go to the L2 layer (e.g., the remote servers 122–126) or the L3 layer (e.g., the content provider 136) and result in a Put( ) command being executed by the L2 or L3 layer. For example, the Get( ) command may go to the L2 layer (e.g., the remote server 122) and retrieve a data item's properties. The retrieved properties will be placed in the L1 layer (e.g., the local cache 120) by a Put( ) command executed by the L2 layer (e.g., the remote server 122).

The QP_GET_FIRST_KEYS flag is set to force the system 100 to "walk" the cache. As those skilled in the art can appreciate, there are times when the system 100 needs to determine precisely what is in a particular cache (e.g., the local cache 120 or any of the remote caches 1–3). The system 100 may walk the cache to sequentially determine the presence of each and every item within the specified cache. The Get( ) command is executed with the QP_GET_FIRST_KEYS flag set in order to start walking the cache. The QP_GET_NEXT_KEYS flag is set to continue walking the cache. The user may specify a given key and cause the system 100 to walk the cache from the specified key.

The QP_GET_ENTRY_PTR flag may be set to permit direct data access into the local cache 120 only. Those skilled in the art of computer programming will recognize that the forced extraction of an index entry pointer bypasses the normal locking mechanisms used in database access and may result in the corruption of the index itself. Thus, direct data access must be performed very carefully. The QP_GET_NOT_EXPIRE flag is set to prevent the deletion of expired items from the cache (e.g., the local cache 120 or any of the remote caches 1–3). For example, the user may wish to walk the cache (i.e., determine the entire contents of a specified cache) including items that would otherwise be expired during the cache walking process.

The QP_NO_LOCAL flag and the QP_NO_REMOTE flag may be used for all cache queries. The QP_NO_LOCAL flag is set to prevent access to the L1 layer (e.g., the local cache 120) if it exists. The QP_NO_REMOTE flag is set to prevent access to the L2 layer (e.g., any of the remote servers 122–126) if they exist.

As previously discussed, a cache query to the L2 layer (e.g., any of the remote servers 122–126) may be performed asynchronously to allow the client 102 to execute other threads while the cache query is executed. If the system 100 is operating in this asynchronous mode, a number of flags may be activated to control operation of the system in the asynchronous mode. The QP_ASYNC flag is set to activate the asynchronous mode in sending or receiving data. The QP_ASYNC_NO_REPLY flag causes the remote server (i.e., any of the remote servers 122–126) to execute a cache query, but does not allow the remote server to send a reply. For example, a Put( ) command or Del( ) command may be executed with the QP_ASYNC_NO_REPLY flag set to avoid having to wait for the remote server to execute the instruction and reply. This is particularly useful when the same Put( )/Del( ) commands are used in parallel to two servers, such as occurs in a fault-tolerant system. The QP_ASYNC_SEND flag is used in conjunction with the QP_ASYNC flag when sending a query to a server. The QP_ASYNC_RECV flag is used in conjunction with the QP_ASYNC flag when receiving a query result from the server. It should be noted that the QP_ASYNC_SEND flag and the QP_ASYNC_RECV flag must be used in conjunction with the QP_ASYNC flag. The QP_ASYNC_CANCEL flag is used in conjunction with the QP_ASYNC_RECV flag to explicitly refuse reception of result of the query. It should be noted that the refusal is automatically performed when a data cache query to a remote server has exceeded the predetermined timeout period.

The system 100 includes additional flags that are used for remote queries and have an effect only when the remote cache (e.g., any of the remote caches 122–126) is part of a fault tolerant server pair. The QP_REMOTE_SRV_MAIN flag is set to force the use of only the main server is there is a fault-tolerant pair. This allows the user to specify the main server for operations, such as a cache walk to determine what is on the primary server. Similarly, the system 100 includes a QP_REMOTE_SRV_FB flag to use only the failback server when there is a fault tolerant pair. This allows the user to specify the failback server is operations, such as cache walking.

As noted above, some flags assume that other flags must be present or absent. For example, the QP_ASYNC_SEND flag and the QP_ASYNC_RECV flag must be used in conjunction with the QP_ASYNC flag. The system 100 returns an error code if the flags submitted by the user are contradictory. For example, if the QP_REMOTE only and QP_LOCAL only flag are both set, the system cannot satisfactorily perform the request and will return a flag error message. The flags can be combined using bit-wise OR operations. For example, a cache query request can include "flags=QP_GET_NOSAVE|QP_GET_NODATA" to produce the desired results.

The structure of the CacheQuery function for a Put( ) command is illustrated below in Table 7.

TABLE 7

Data Structure for Put CacheQuery Command

```
pCacheQuery->key = pbKey;           // give key and its size
pCacheQuery->key_size = cbKeySize;
pCacheQuery->data = pbItemData;     // give data and its size
pcacheQuery->data_size = cbDataSize;
// give expiration limits (indexes into limits arrays):
pCacheQuery->time_type = 3;         // which expiration time limit to use (0 to N)
pCacheQuery->freq_type = 2;         // which frequency of use limit to use (0 to M)
// you can also use some flags for Put()
// (set the flags like this: pCacheQuery->flags|= QP_PUT_NO_OVERWRITE).
iRetVal = pCache->Put (pCacheQuery);
if(iRetVal)
{
        // handle errors
}
else
{
// OK, put was a success
}
```

Thus, a Put( ) command specifies a key, which will be used to locate the item, the size of the item, and any expiration limits, as described above. The flags listed in Table 6 may be used to control operation of the system when executing the Put( ) command. For example, the Put( ) command generally will cause the overwriting of an existing data entry in the cache (e.g., the local cache 120 or any of the remote caches 1–3) that use the same key. However, this can be prevented by setting the QP_PUT_NO_OVERWRITE flag in the Put( )command.

The structure of the CacheQuery function for a Get( ) command is illustrated below in Table 8.

TABLE 8

Data Structure for A Get Command To Retrieve Data From the Cache

```
pCacheQuery->key = pbKey;              // give key and its size
pCacheQuery->key_size = cbKeySize;
pCacheQuery->data = pbBuffer;          // give buffer for output data and its size
pCacheQuery->data_size = cbBufferSize;
// You can also use some flags for Get()
// (set the flags like this: pCacheQuery->flags | = QP_GEI_NO_PROVIDER).
flags:
QP_GET_NO_PROVIDER - servers do not ask their configured providers if the item is not in
their cache
QP_GET_UNLIM_PROVIDER - let you use provider chains of any length i.e. any number of
cache levels. By default cache server will set QP_GET_NO_PROVIDER flag in the query
before calling provider, so that providers who obey that flag, like cache servers do,
will not call any more providers if they don't have the item.
This prevents infinite loops (for searching items which are not present in any of the
servers caches) in provider calls if there is a circle in provider chain. e.g. if
configured like: server A is provider for server B and server B is provider for server A.
iRetVal = pCache->Get (pCacheQuery);
if (#RetVal < 0)
{
    // handle errors
else
// OK, use result: pg->data_size has size of data returned etc.
}
```

Thus, a Get( ) command specifies the key, which will give the location of the item within the cache (e.g., the local cache 120 or any of the remote caches 1–3) and defines a buffer large enough to hold the item (i.e., the data blob) that will be retrieved from the cache. In addition, optional flags may be set as indicated above.

As previously discussed, a requested data item may not be present in the local cache 120. In that case, the request for a particular data item may be routed to the L2 layer (e.g., any of the remote servers 122–126) or other or the L3 layer (e.g., the content provider 136). When the data item is retrieved, it may be stored in the local cache 120, on any of the remote servers 122–126 or not stored at all depending on the setting of flags and other parameters in the Get( ) command. Thus, there are certain conditions in which a Get( ) command may also internally generate a Put( ) command. If one of the remote servers 122–126 in the L2 layer or other content provider provides data in response to the Get( ) command, the remote server executes a Put( ) command to save the data to the local cache 120. The Put( ) command can also specify expiration time and frequency limits as discussed above with respect to the Put( ) command. Additional policies for data storage and retrieval may be determined by the flags in the manner discussed above.

The structure of the CacheQuery function for a Delete command is illustrated below in Table 9.

TABLE 9

Data Structure for A Delete Function To Retrieve Data From the Cache

```
pCacheQuery->key = pbKey;        // give key and its size
pCacheQuery->key_size = cbKeySize;
iRetVal = pCache->Del (pCacheQuery);
if(iRetVal < 0)
{
    // handle errors: not found etc.
}
else
{
// OK, was found and deleted
```

Thus, a Del( ) command specifies the key, which will give the location of the data item within the cache (e.g., the local cache 120 or any of the remote caches 1–3). It should be noted that the data structure of the Del( ) command does not require specification of a buffer since the data will be deleted and not stored in any other portion of the system 100. In addition, optional flags may be set as indicated above in Table 6. If the specified data item is located it is deleted and a confirmation message returned. If the specified data item is not located, an error message is returned.

Access to the cache (e.g., the local cache 120 and any of the remote caches 1–3) and the identification of data items within the cache are controlled using a conventional index/hashing model. Although a simple example of a hashing function is provided below, those skilled in the art will appreciate that other conventional hashing functions can be satisfactorily used with the system 100. In an exemplary embodiment, the local cache 120 has a hash table array whose size is a prime number and which contains pointers to index entry structures. Each index entry structure contains an item key, item properties, and a link to the data item (i.e., the data blob). The index entry structure is approximately 40 bytes in length.

The hashing method is selected to permit fast access to the cache (e.g., the local cache 120 and any of the remote caches 1–3) and flexible scalability to a very large number of data entries. In addition, a hashing model index provides low memory overhead and can grow a number of times before access times become significant and decrease the overall performance of the system 100.

In addition, an exemplary embodiment of a hashing model utilizes chained hashing, which allocates only the number of index entry structures that are actually used. Chained hashing always provides sufficient space for new data entry structures in the index, unlike some methods of open addressing hashing. Chained hashing also permits the growth of the number of entries well beyond the hash table size. The average size of the chains in the chained hashing is kept under control by allocating the hash table size at approximately twice as large as the projected number of entries in the cache (e.g., the local cache 120 and any of the remote caches 1–3).

An example hashing function is provided below in Table 10.

TABLE 10

Index/Hashing Model

DWORD Hash(BYTE *key. DWORD key_size, int prime)
{
    for(h=i=0; i<key_size; i++, key++) if(*key) h= (*key) + prime*h
    return h;
}

In one embodiment, a prime number of 131 or larger may be used and null bytes in the key are skipped to optimize the code on Unicode keys. Unicode keys may be conveniently used to represent search strings in any language. The hashing function described in Table 10 provides a fairly even distribution of chain length for different hash table sizes with a low standard deviation on both random keys, real-life search queries such as an Internet search, text strings, and the like.

In alternative embodiment, the keys may be set to fixed size integers, such as a 32-bit or 64-bit integer, and effectively utilize a different hash function. For example, an LK-Hash function has the advantage of dynamic resizing to grow or shrink as necessary, and permits bundling of keys for better usage of processor caching when searching long chains. Such one key bundling can improve speed up to 15%. In addition, the LK-Hash function permits the use of spin locks, which are advantageous on a multiprocessor machine.

Those skilled in the art will appreciate that the LK-Hash function also has disadvantages in that it is primarily a "pointer" hash, which does not copy or protect data. Additional locks are necessary for data protection with such a hash function. These additional functions require more levels of locking than the hashing function described with respect to Table 10. Furthermore, the LK-Hash function requires a second hash for subtable picking to grow and shrink the table. The additional subtable requires extra locking. These additional locking functions all decrease performance of the system 100 because they require additional processor cycles.

The CLocalCache is a previously defined class in which objects thereof reside on the client 102 and on each remote server (e.g., the remote servers 122–126). The CLocalCache has an index structure that comprises a hash table with pointers to index entry structures, which may be referred to as linked lists. Table 11 below provides a sample of an index entry structure:

TABLE 11

Hash Table Entry Data Structure

```
struct
{
    // Key
    BYTE *key;                    // hash key
    WORD key_size;                // key size in bytes
    // data Blob
    DWORD data_idx;               // index into cache data section packed with its number
    DWORD data_size;              // item data size
    BYTE *tail;                   // last part of item data, less than one page
    // chain link
    struct_tagHTabEntry  *next;   // next index in the hash chain
    // properties and stats
    DWORD crea_time;              // entry creation time: GetTickCount()
    DWORD times_used;             // number of times it was used since insert: Ref.Count
    BYTE time_type;               // entry properties: TIME_LIMIT_TYPE.
    BYTE freq_type;               // FREQ_LIMIT_TYPE
    // status
    LONG status;                  // if ready for readers
    LONG nReaders;                // number of current readers
} HTEntry;
    // HTEntry status codes:
    #define THE_FRESH    0        // just created, but no data is inserted yet
    #define HTE_READY    1        // has data and all ready
    #define HTE_LOCKED   2        // locked for data insertion
```

As those skilled in the art will appreciate, the hash table is an array of pointers to the structures containing keys and their properties for the local cache 120 and for all specified remote caches (e.g., the remote caches 1–3). In addition, the hash table contains locking and chaining data. These pointers (i.e., entries of the hash table) are NULL when the table is initially created. The locking of data is required for the thread-safe use when multiple user threads and/or update threads are trying to use the same entry. "Locking" refers to a process in which the system 100 will prevent multiple threads from altering the keys to prevent corruption of the has table. The locking function permits multiple users to read the entries in the hash table at any given time, but only allows one thread at a time to write to the hash table. Furthermore, the locking process will not allow any key to be written while any other readers are reading that particular key. These safety procedures are discussed in further detail below. Thus, the integrity of the hash table is protected.

The hash table can exist in multiple states. When initially, created, the hash table is in an empty state in which all pointers have NULL values. In addition, the hash table may be locked for an update, which means that some thread has access to the hash table for the purpose of writing to it. Other threads cannot read the hash table while the one thread is writing to it. In another state, the hash table is open for readers (i.e., READY), which indicates that the hash table may be accessed by multiple threads only for the purpose of reading the hash table. When the hash table is being read by one or more threads, the value nReaders has a value corresponding to the number of threads currently reading the hash table. The hash table also includes a "Wanted" state indicating that a particular thread wants to write to the hash table, but there are currently other threads reading the hash table (i.e., nReaders>0). In this event, the thread wanting to write to the hash table puts a lock into the state to prevent any more readers from accessing the hash table, but lets the current readers finish reading before writing to the hash table. When the readers have completed accessing the hash table (i.e., nReaders=0) the hash table enters the locked state to be updated by the thread wishing to write to the hash table.

Thus, the hash table allows multiple readers, but protects the integrity of the data by allowing only one writer at a time. As previously discussed, the client 102 typically includes only one instance of the CLocalCache. A single hash table index exists for the local cache 120. If the system 100 includes one or more remote caches (i.e., multiple remote servers), there is a list of indices for each remote server.

Figure 6:
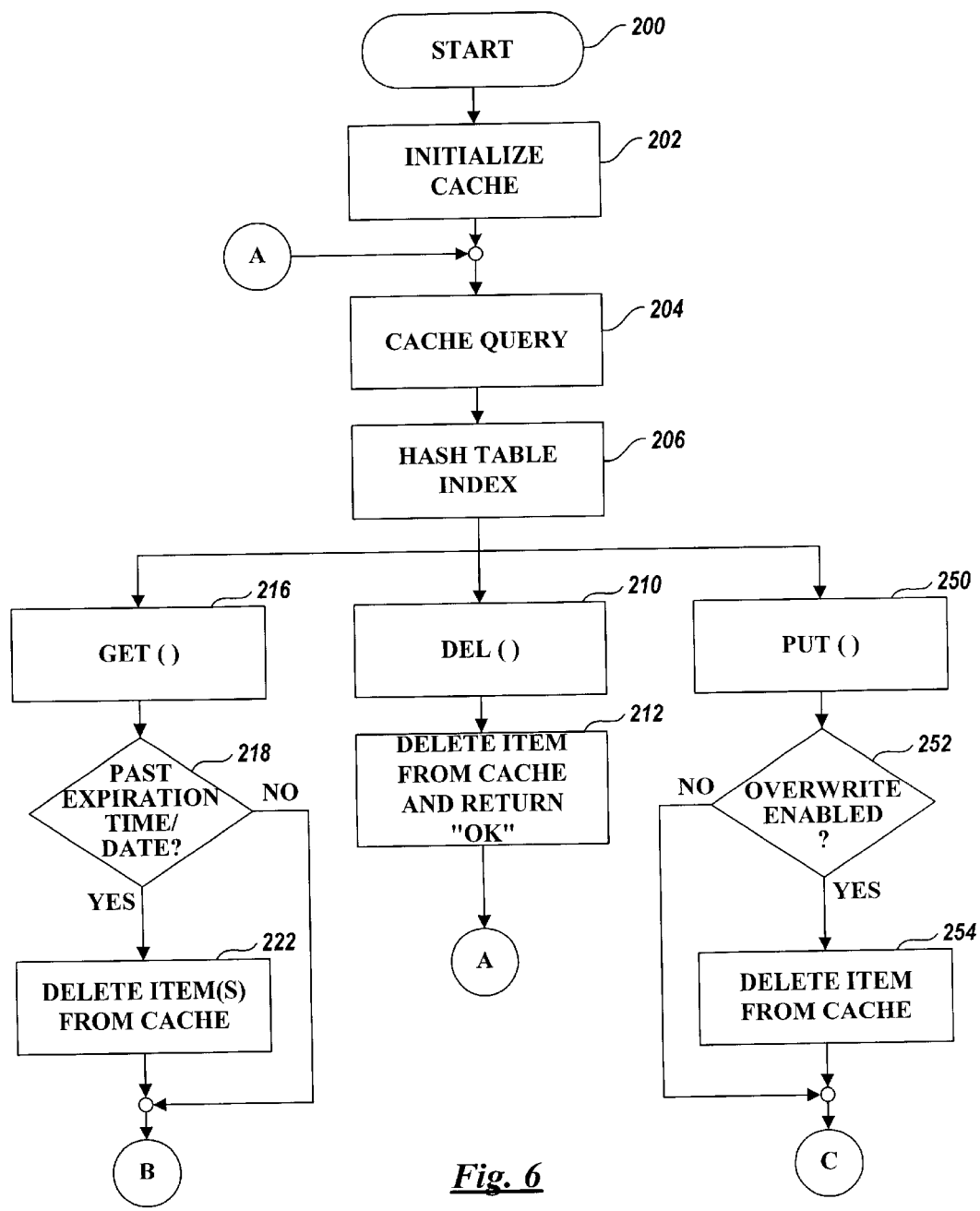
FIGS. 6, 7 and 8 together form a flowchart illustrating the operation of the application a programming interfaces of the present invention.
Figure 7:
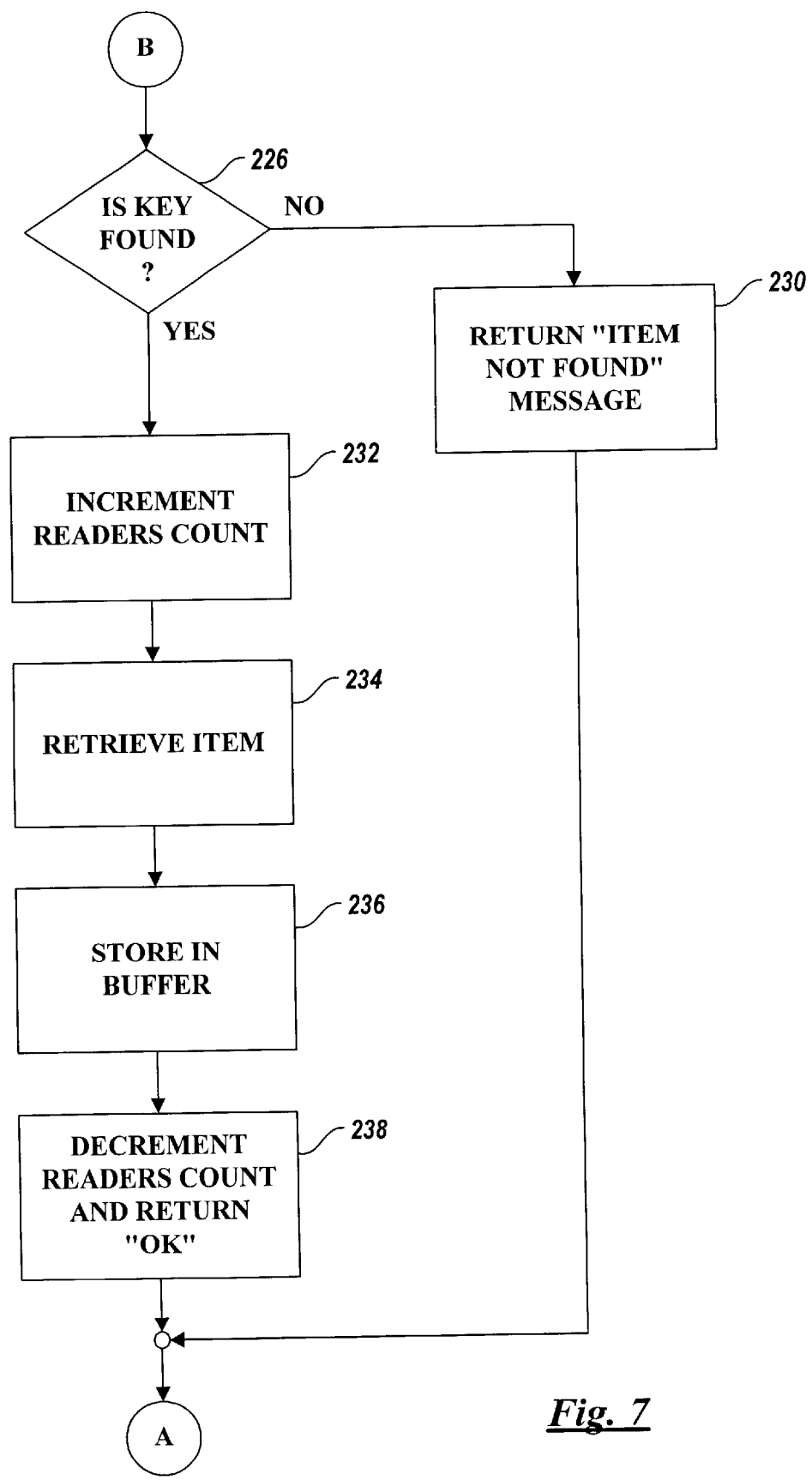
Figure 8:
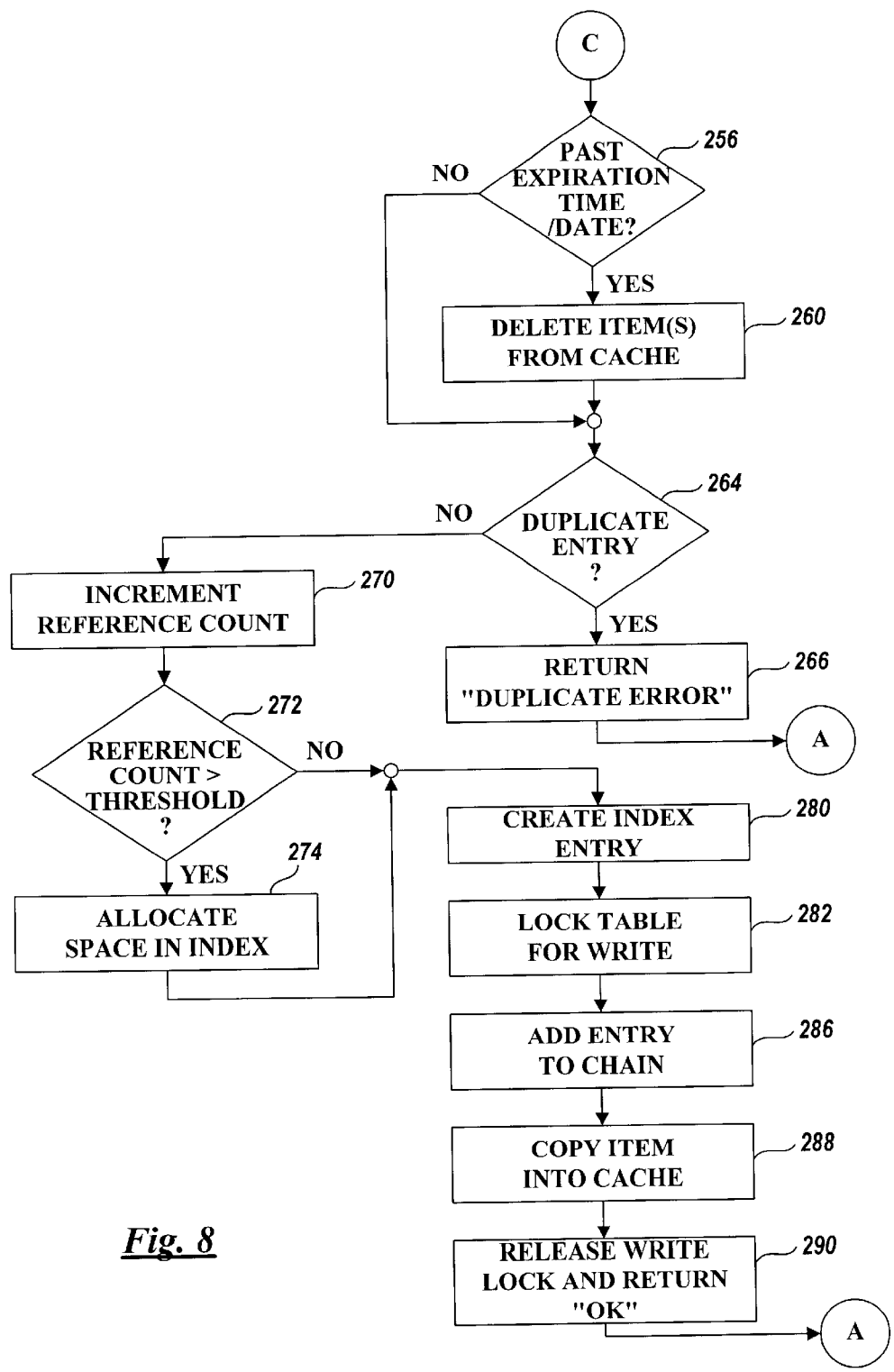

The operation of the API of the system 100 is illustrated in the flowchart of FIGS. 6-8. At a start 200, shown in FIG. 6, a computer system is operational. In step 202, a software program call initializes the cache 106 (see FIG. 2). As previously discussed, the cache initialization may be performed using data in the registry, or via a function call. As previously noted, the initialization procedure need only be performed once to establish the cache 106. The local cache 120 (see FIG. 5) and all remote caches (e.g., the remote caches 1–3 on the remote servers 122–126) may also be specified using the examples provided above.

In step 204, the API generates a CacheQuery call. In an exemplary embodiment, the various commands used by the class CCache utilizes the identical CacheQuery data structure for various commands, such as the Get( ) command, the Put( ) command, and the Del( ) command. In step 206, the system 100 generates a hash table index. The hash table index will be used to identify the item to be retrieved from the cache (i.e., the Get( ) command), stored in the cache (i.e., the Put( ) command), or deleted from the caches (i.e., the Del( ) command). The hash table also provides the location in the system 100 where the data item is stored (e.g., in the local cache 120 or on one of the remote servers 122–126).

If the CacheQuery is the Del( ) command 210, the system 100 identifies the item to be deleted and, in step 212, deletes the item from the cache and returns an "OK" message indicating that the selected item was properly deleted from the cache. Following the completion of step 212, the system 100 returns to step 204 and awaits the next CacheQuery.

If the CacheQuery is a Get( ) command 216, the system 100 moves to decision 218 to determine whether the cache (either the local cache 120 or any of the remote caches 1–3) contains any items that are past due based on the time or frequency parameters specified for each item. In an exemplary embodiment, the system 100 checks the hash table index for all stored items that may be past their expiration time/date. All items that are past the specified expiration time/date are stored in a "Delete" list and deleted in step 222. Alternatively, the system 100 can check only the requested item to determine whether the requested item is past the expiration time/date. If no item in the cache is past the expiration time/date, the result of decision 218 is NO.

In that event, or following the deletion of items in step 222, the system 100 moves to decision 226, shown in FIG. 7, to determine whether the key for the requested item has been found in the hash table index. If the key has not been found, the result of decision 226 is NO. In that event, in step 230, the system returns with a "Item Not Found" message. The system then returns to step 204 in FIG. 6 to await the receipt of another CacheQuery.

If the key for the requested item has been found, the result of decision 226 is YES. In that event, in step 232, the system 100 increments the readers count to indicate that a thread is accessing the cache to read an item. In step 234i the system 100 retrieves the item from the cache and in step 236 stores the item in the buffer specified in the cache query. In step 238, the system 100 decrements the readers count and returns with a "OK" message. Following the operation of step 238, the system 100 returns to step 204 in FIG. 6 to await another CacheQuery.

Returning again to FIG. 6, if the CacheQuery instruction is a Put( ) command 250, the system 100 moves to decision 252 to determine whether the overwrite flag has been set to enable overwriting of an existing matching entry in the cache. If the overwrite has been enabled, the result of decision 252 is YES. In that event, in step 254, the system 100 deletes the item from the cache.

If the overwrite has not been enabled, the result of decision 252 is NO. In that event, or after deletion of the item from the cache in step 254, the system 100 moves to decision 256, shown in FIG. 8, to determine whether any items in the cache are past their expiration time/date. As discussed above, the system 100 may analyze all data entries in the cache and place all items that are past the expiration time/date in a Delete list. Alternatively, the system may only determine whether the requested item is past the specified expiration time/date. If an item is past the specified expiration time/date, the result of decision 256 is YES. In that event, the system 100 moves to step 260 and deletes the item(s) from the cache.

If no items are past the specified expiration time/date, the result of decision 256 is NO. In that event, or following deletion of the items from the cache in step 260, the system 100 moves to decision 264 to determine whether the requested item is a duplicate entry. If the requested item is a duplicate entry, and the overwrite was not enabled, the system 100 returns a "duplicate error" message in step 266 and returns to step 204 in FIG. 6 to await another Cache-Query.

If the requested entry is not a duplicate entry, the result of decision 264 is NO. In that event, in step 270, the system 100 increments the reference count indicating the number of items that are stored in the cache. As discussed above, various flags may be set to control the retrieval and storage of data in the system 100. Flags may be used to specify where data can be retrieved and where data will be stored (e.g., in the local cache 120 and/or on one or more of the remote servers 122–126).

In decision 272, the system 100 determines whether the reference count is above a specified threshold. If the reference count is above a specified threshold, the result of decision 272 is YES. In that event, the system 100 moves to step 274 to allocate additional space in the hash table index.

If the reference count is not above the threshold, the result of decision 272 is NO. In that event, or following the allocation of space in step 274, the system moves to step 280 to create an index entry in the hash table index for the new item. In step 282, the system 100 locks the hash table for a write operation. As noted above, the system allows only one write thread to be active at a time. If one or more read threads are currently active, the system will lock the table until the reader count for that particular data entry is zero. At that point, the system 100 adds the entry to the chain in the hash table index in step 286. In step 288, the system 100 copies the item into the cache. If the reference counts is not above the threshold (i.e., the result of decision 272 is NO), the system 100 will write the item's properties to hash table index, but will not store the data item itself in the cache. In step 290, the system 100 releases the write lock and returns an "OK" message. The system then returns to step 204 in FIG. 6 to await the receipt of another CacheQuery. Thus, the system 100 can accommodate multiple readers and provides protection to the critical hash table index so as to prevent corruption thereof.

Figure 9:
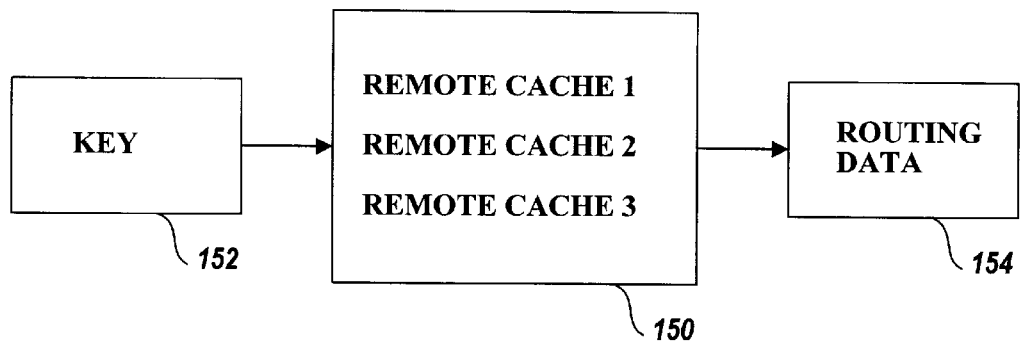
FIG. 9 is a functional block diagram illustrating the operation of the remote cache system to determine the location of a data item within one of an array of remote data caches.

With an array of remote caches, the system 100 must be able to track which remote cache contains a particular data item. The system 100 determines which of the remote caches contains a requested data item using a Server Routing Object. The Server Routing Object is essentially a map 150, illustrated in FIG. 9, which contains location data for each of the remote caches. For example, the map 150 illustrated in FIG. 9 will typically contain data identifying the server on which each of the remote caches 1–3 may be found. However, for clarity in describing the system 100, the map 150 of FIG. 10 simply identifies the remote caches 1–3. To identify which remote cache contains the desired data, a key 152 is hashed with the map 150 to produce routing data 154, which uniquely identifies one of the remote caches 1–3 as the location in which the desired data item is stored. As previously discussed, the key 152 uniquely identifies the requested data item and may be a numerical value, search string, or the like. The hashing process is also within the scope of knowledge of one skilled in the art and thus will not be described in greater detail herein. However, the hashing process produces the routing data to uniquely identify the remote cache containing the requested data item. If the requested data item is not previously stored in the remote cache identified by the routing data 154, the data can be retrieved from the content provider (e.g., the content provider 136 of FIG. 5). When the requested data item is retrieved from the content provider, it will be stored in this particular remote cache previously identified by the routing data 154. A future request for the particular data item will result in its retrieval from the identified remote cache.

The system 100 allows additional remote servers to be dynamically added without having to reinitialize the entire system. FIG. 5 illustrates the local cache 120 and remote caches 1–3. The system illustrated in FIG. 10 includes a remote cache 4, which is also coupled to the local cache 120 (see FIG. 5) via the network connection 130. The AddRemoteCache( ) command simply identifies the one or more additional caches being added to the remote configuration data, shown in the example of Table 2. For the sake of clarity, FIG. 10 does not illustrate the servers 122–126 associated with each of the remote caches 1–3, respectively, or the server (not shown) that contains the remote cache 4. However, those skilled in the art will recognize that remote caches are typically implemented on a server that is coupled to one or more other servers via network connections, such as the network connection 130.

Figure 11:
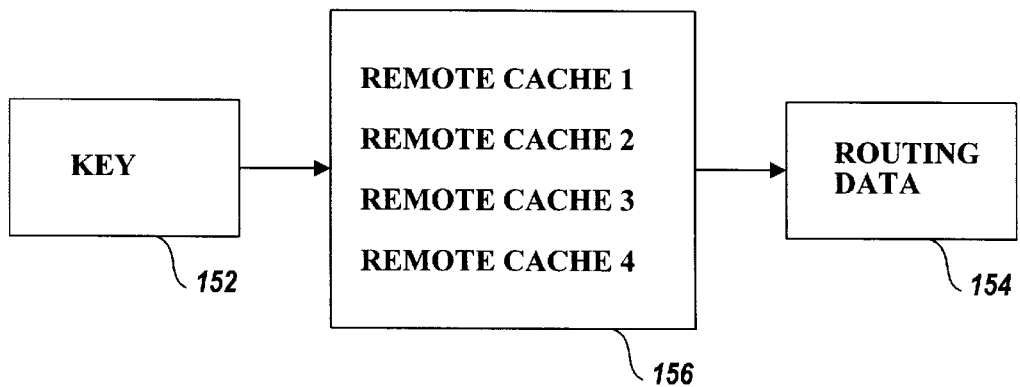
FIG. 11 is a functional block diagram illustrating the operation of the remote cache system to determine the location of a requested data item with the addition of new remote caches.

When a new remote cache (e.g., the remote cache 4 of FIG. 10) is added to the system 100, a new map is generated to provide identification data for the new remote cache as well as identification data for all previously configured remote caches. As those skilled in the art will appreciate, the CLocalCache object must be initialized on the remote cache 4 prior to adding the remote cache to the system. Thus, the data structures required to operate the remote cache 4 must already be initialized, in place and running prior to adding the remote cache configuration data. In the example illustrated in FIG. 10, the remote cache 4 has been initialized in the manner described above, and is added to the remote cache configuration using the AddRemoteCache( ) command. As a result, a new map 156, illustrated in FIG. 11, is generated to provide identification data for any newly added remote caches (e.g., the remote cache 4) as well as identification data for the previously configured remote caches (e.g., the remote caches 1–3). As previously noted, the map contains identification data for the remote servers. For clarity, the new map 156 simply identifies the remote caches 1–4. The key 152 is hashed with the new map 156 in the manner described above to generate the routing data 154. In an exemplary embodiment, the system 100 does not destroy the map 150, but retains it to identify the location of data items whose location cannot be determined with the new map 156.

Figure 12:
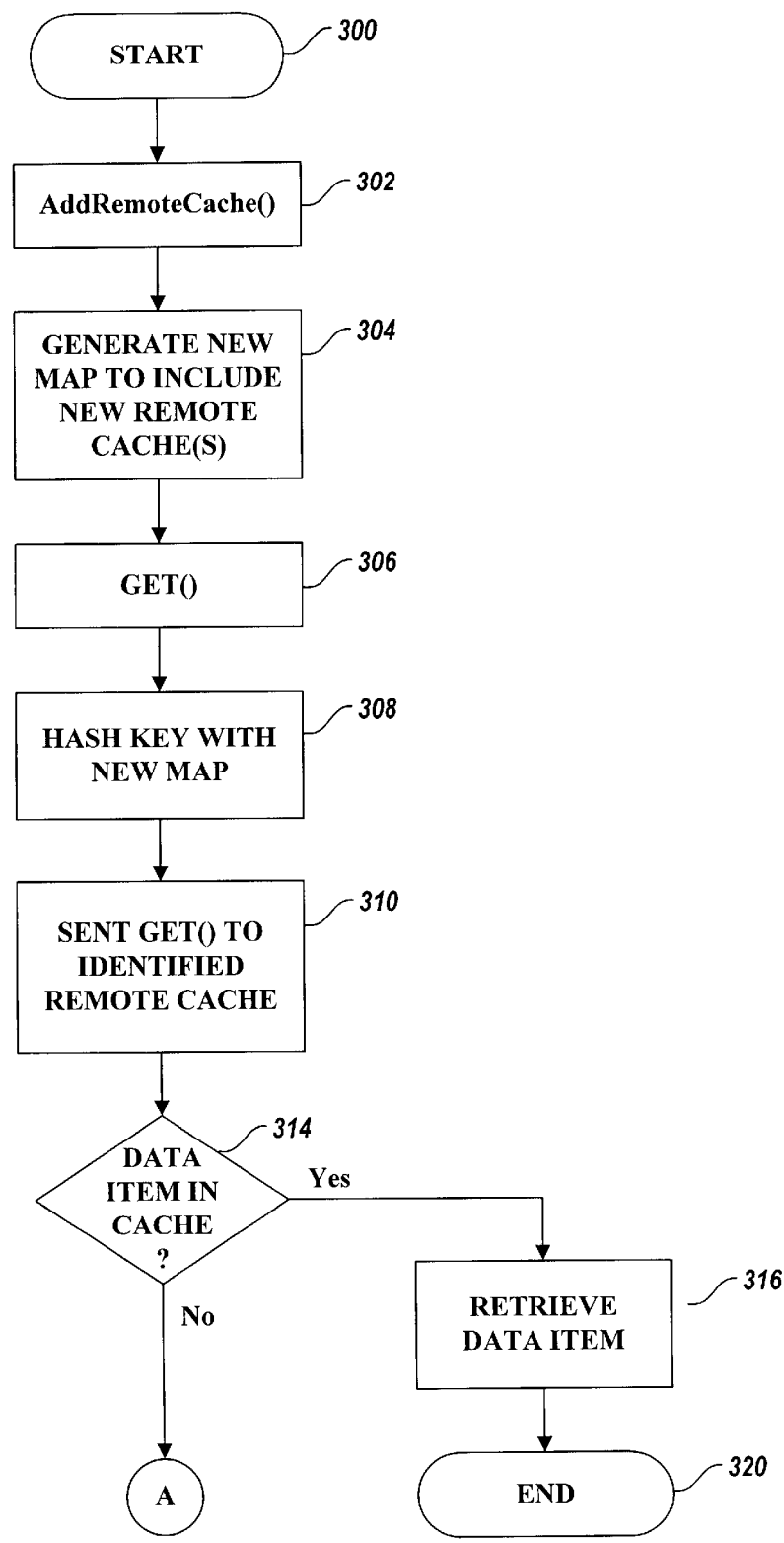
FIGS. 12 and 13 together form a flowchart illustrating the operation of the system to accommodate the addition of remote caches to the system.
Figure 13:
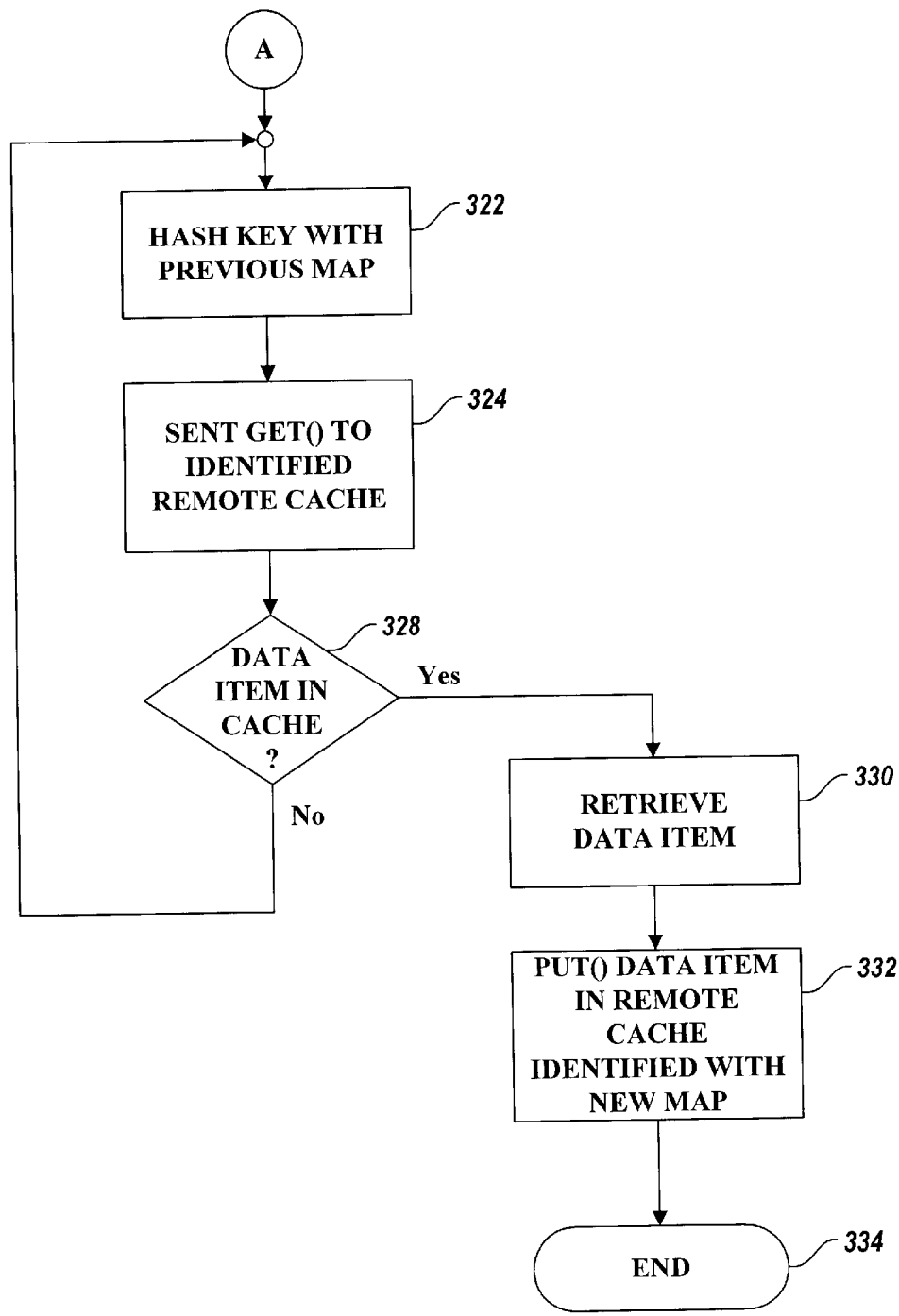

This process is illustrated in the flowchart of FIGS. 12–13. At a start 300, shown in FIG. 12, it is assumed that the system 100 has already been initialized and is operational with at least one local cache (e.g., the local cache 120 shown in FIG. 5) and at least one remote cache (e.g., the remote caches 1–3). Furthermore, the new remote cache or caches to be added to the system have also been initialized and are operational. In step 302, the user executes an AddRemoteCache( ) command along with the identification data for the new remote cache(s). As noted above, this identification data is typically identification data for the server(s) containing the newly added remote cache(s). In step 304, the system 100 generates a new map (e.g., the new map 156) to include the new remote cache(s) at a subsequent time when a Get( ) command is generated in step 306. As previously discussed, the Get( ) command includes a key to uniquely identify the requested data item. In step 308, the system hashes the key with the new map (e.g., the new map 156) to generate the routing data 154. As noted above, the routing data 154 identifies the cache containing the requested data item. In step 310, the system 100 sends the Get( ) command to the identified remote cache.

When a new remote cache, such as the remote cache 4 (see FIG. 10), is added to the system, it initially contains no data items. In the data routing example illustrated in FIG. 9, the map 150 generated the routing data 154 only for the remote caches 1–3. However, the hash process in step 308 will periodically identify the remote cache 4 as the remote cache containing a requested data item. When the remote cache 4 is cold (i.e., contains no data items), the routing data 154 indicating remote cache 4 as the storage location will be incorrect. However, the system 100 stores previous maps (e.g., the map 150 of FIG. 9) to retrieve a data item and store it in the location indicated by the new map (e.g., the new map 156). In this manner, the system slowly balances the load between all of the specified remote caches. This process is described below for the addition of the remote cache 4.

The system 100 generates the routing data 154 (see FIG. 11) in step 308 using the new map (e.g., the new map 156) and sends the Get( ) command to the identified remote cache in step 310. In decision 314, the system 100 determines whether the requested data item is in the identified remote cache. The process of locating a data item within a particular cache has been described above with respect to the index tables available for each of the remote caches. If the requested data item is present in the cache, the result of decision 314 is YES. In that event, in step 316, the system 100 retrieves the data item and routes it in accordance with flags that are included as part of the Get( ) command. Following the retrieval and routing of the data item, the system ends the process at step 320.

If the data item is not in the identified remote cache, the result of decision 314 is NO. This result may occur in the situation described above where the remote cache 4 has been identified as the remote cache containing the requested data item. If the data item is not in the identified remote cache, the system 100 hashes the key with the previous map (e.g., the map 150 of FIG. 9) in step 322, shown in FIG. 13. For example, assume that the hash process of step 308 indicated that the requested data item is in the remote cache 4 when, in fact, the requested data item is actually stored in the remote cache 3. By retaining previous maps, the system 100 can hash the key with one or more previous maps to determine the actual location of the requested data item. Following the hashing process with the previous map in step 322, the system 100 sends the Get( ) command to the identified remote cache in step 324. In the example presented above, the remote cache 3 is identified as the remote cache containing the requested data item. Thus, in step 324, the Get( ) command is sent to the remote cache 3.

In decision 328, the system 100 determines whether the requested data item is stored in the identified remote cache. This process is performed in the manner described above with respect to index list maintained on the remote server associated with the remote cache. If the requested data item is not in the identified remote cache, the result of decision 328 is NO. In that event, the system 100 may return to step 322 and hash the key with an earlier version of the map. It should be noted that this process can continue indefinitely. However, those skilled in the art can appreciate that there is a practical limit to how many previous maps should be used before overall efficiency of the system is degraded. At some point, it may be more efficient to simply retrieve the requested data item from a content provider (e.g., the content provider 136 of FIG. 5) rather than continue to hunt for the requested data item using old maps. For example, the system can limit its search to three previous maps. If the requested data item is not found using the three previous maps, the Get( ) command is forwarded to the content provider to allow retrieval of the data in the manner described above.

If the requested data item is in the identified remote cache, the result of decision 328 is YES. In the example presented above, the initial hash process of step 308 (see FIG. 12) indicated that the requested data item was in the remote cache 4 and the hash process of step 322 indicated that the requested data item is in the remote cache 3. In step 330, the system retrieves the requested data item from the identified remote cache (e.g., the remote cache 3) and routes the requested data item in accordance with the flags accompanying the Get( ) command. In step 332, the system 200 executes a Put( ) command to store the requested data item in the remote cache that was identified by the routing data from the new map in step 308 (see FIG. 12) and the process ends at step 334. In the example discussed above, the remote cache 4 was initially identified by the hash process of step 308 as the location of the requested data item. Thus, in step 332, the Put( ) command stores the requested data item in the remote cache 4. In this manner, the system has begun to balance the stored data items between all of the identified remote caches (e.g., the remote caches 1–4). As additional Get( ) commands are executed by the system, some requested data items stored in the remote caches 1–3 will be transferred to the remote cache 4 until the system 100 achieves some load balance between the remote caches 1–4.

If the new remote cache (e.g., the remote cache 4) has a different storage capacity than the other remote caches (e.g., the remote caches 1–3), the mapping process described herein can be modified to balance the workload based on the relative storage capacities of the various remote caches. Such alteration to the mapping process can be accomplished by one skilled in the art without additional information. Thus, the system 100 advantageously allows new remote caches to be added to the system on the fly and achieves load balancing between the remote caches to accommodate the addition of the new remote cache(s).

Figure 10:
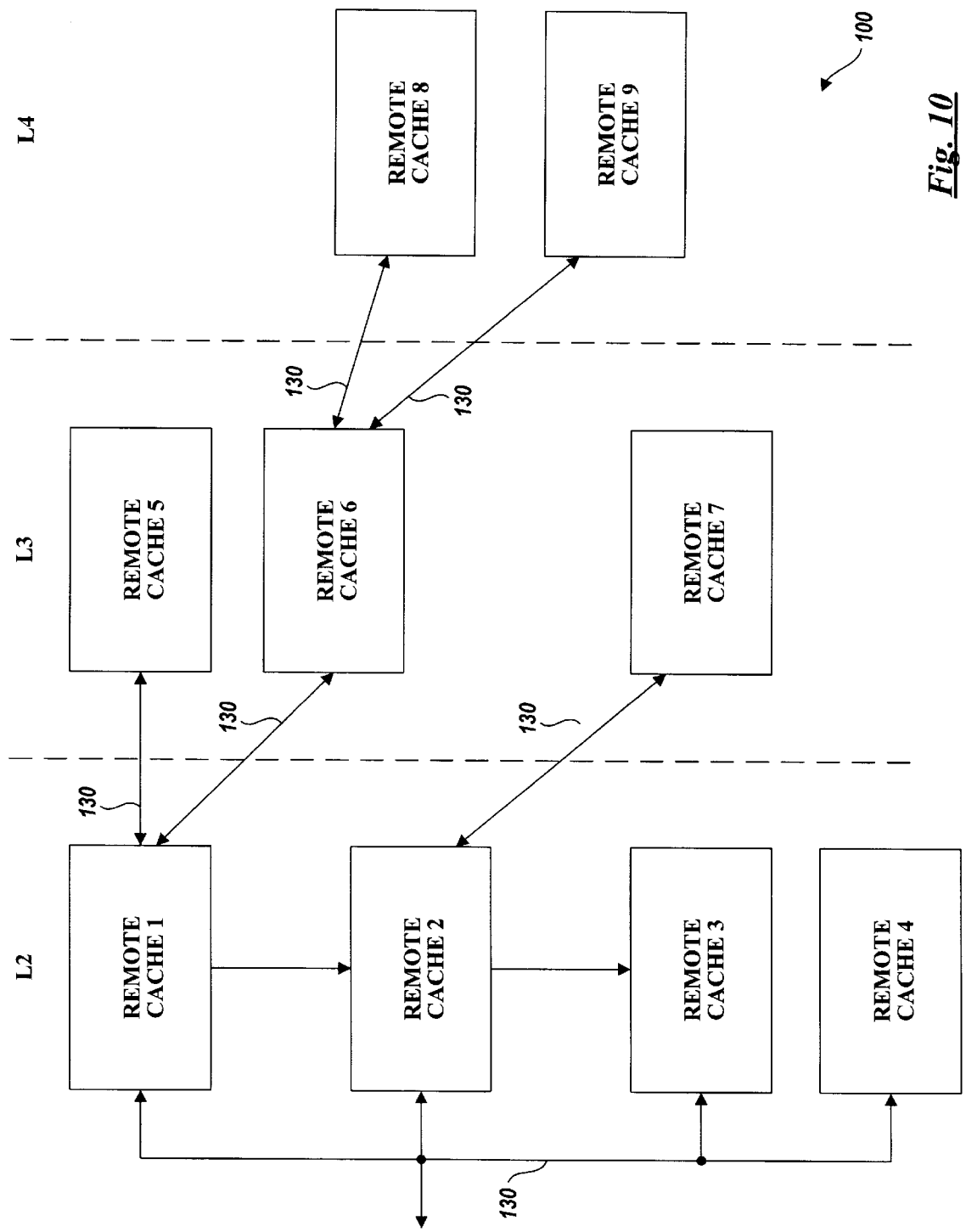
FIG. 10 is a functional block diagram illustrating an example configuration of an array of remote data caches.

As previously discussed above, the system 100 advantageously permits a flexible distributed cache topology in which additional caches may be dynamically added to the system at virtually any point in the system. That is, it is not necessary to reinitialize the entire distributed cache system merely to add an additional cache. FIG. 5 illustrates the remote caches 1–3 and the servers 122–126, respectively. In the embodiment illustrated in FIG. 5, each of the remote caches 1–3 is identified in the remote configuration data for the cache controller 116 of the local cache 120. As such, the local cache 120 may communicate directly with any of the remote caches 1–3. However, each of the remote caches 1–3 may in turn be able to communicate with one or more additional remote caches. This is illustrated in the example of FIG. 10 where the remote caches 1–3 are part of the level L2 distributed cache system. The remote caches 1–3 can communicate directly with the client 102 (see FIG. 5) via the network connection 108 or via the local cache 120 via the network connection 130. As noted above, FIG. 10 does not illustrate the remote servers associated with any of the remote caches. However, those skilled in the art will recognize that the typical implementation of the system 100 will utilize a server for each of the remote caches.

In FIG. 10, the remote cache 1 has additional remote caches that have been configured in accordance with the examples of Table 2 above. Specifically, the remote cache configuration data for the remote cache 1 indicates that a remote cache 5 and a remote cache 6 are accessible to the remote cache 1 via the network connection 130. It should be noted that the network connection 130 between the remote cache 1 and the remote caches 5–6 may be the identical network connection coupling the remote cache 1 with the local cache 120 (see FIG. 5). However, those skilled in the art will appreciate that the local cache 120 cannot communicate directly with the remote caches 5–6 because the remote caches 5–6 have not been configured for the local cache 120. The remote caches 5–6 have been configured for the remote cache 1 and are therefore accessible by the remote cache 1. The local cache 120 can access the remote caches 5–6 only via the remote cache 1.

FIG. 10 also illustrates a remote cache 7 coupled to the remote cache 2 via the network connection 130. As described above, the local cache 120 (see FIG. 5) cannot communicate directly with the remote cache 7 because the local cache 120 does not contain the remote configuration data identifying the remote cache 7. However, the remote cache 2 contains remote configuration data identifying the remote cache 7 by its server name, dotted IP address, or other conventional network name and therefore can communicate with the remote cache 7. In the example illustrated in FIG. 10, the remote caches 5–6 form a layer L3 in the system 100. Caches in the L3 layer are accessible only by caches in the L2 layer that contain the appropriate remote configuration data. In the example illustrated in FIG. 10, only the remote cache 1 can communicate with the remote caches 5–6 while only the remote cache 2 can communicate with the remote cache 7.

In the example of FIG. 10, the remote cache 6 also contains remote configuration data for a remote cache 8 and remote cache 9, which are part of an L4 layer in the distributed cache system. Communication with the remote caches 8–9 must be routed through the remote cache 6, which contains the remote configuration data for the remote caches 8–9. Thus, the local cache 120 (see FIG. 5) can access a cache in the L4 layer (e.g., the remote cache 8) only via the layer L2 (e.g., the remote cache 1) and the layer L3 (e.g., the remote cache 6). It should be noted that the topological configuration of FIG. 10 is an example intended only to illustrate the flexibility of the distributed cache system of the present invention. The system can be readily arranged in other topological configurations. For example, the remote cache 6 can be configured to communicate directly with the remote cache 2 simply by adding it to the remote configuration data in the server (not shown) implementing the remote cache 2. The specific examples are presented herein to provide a better understanding of the invention and should not be considered limitations to the invention.

The location of a desired data item (e.g., the data blob) is determined using the map of the Server Routing Objects associated with remote caches at each layer of the distributed cache system. For example, the local cache 120 (see FIG. 5) contains a map (e.g., the map 156 of FIG. 11) identifying the remote caches 1–4 in the remote configuration data (see Table 2). In turn, the server associated with the remote cache 1 contains a map identifying the remote caches 5–6 in its remote configuration data.

If the client 102 (see FIG. 5) requests a particular data item, the system 100 uses the Get( ) command to retrieve the requested data from the local cache 120. If the requested data is not present in the local cache 120, the system 100 hashes the key with the map of the remote caches that are available to the local cache (e.g., the remote caches 1–4) to identify which of the remote caches contains the requested data item. For example, assume that a requested data item is physically stored in the remote cache 9. From the perspective of the local cache 120, any data retrieved from the remote cache 1 or any remote caches in layers L3, L4, etc., that are connected via the remote cache 1 (e.g., the remote caches 5–6 and 8–9) appear to be located in the remote cache 1. Thus, the requested data item in the present example will be identified as contained in the remote cache 1. The Get( ) command is passed to the remote cache 1 in an attempt to retrieve the data. The Get( ) command is processed by the CLocalCache class associated with the remote cache 1. If the requested data item is present in the remote cache 1, it is routed to the client via the local cache 120. Under some circumstances, the requested data item is not contained within the remote cache 1, but may be contained within remote caches accessible to the remote cache 1. In this event, the Server Routing Object associated with the remote cache 1 hashes the key with the map in,the remote cache 1 to identify the location of the requested data item. In the present example where the requested data item is stored in the remote cache 9, the remote cache 1 is configured to recognize only the remote caches 5–6. However, from the perspective of the remote cache 1, any data stored on the remote caches 8–9 appears as if it is present in the remote cache 6. Thus, the hash will indicate that the requested data item is located in the remote cache 6. If the data item is present in the remote cache 6, it is routed to the local cache 120 via the remote cache 1. If the requested data item is not present in the remote cache 6, a Server Routing Object. associated with the remote cache 6 hashes the key with the map in the remote cache 6 to identify the location of the requested data item in remote servers accessible by the remote cache 6. In the present example, the hashing process in the remote cache 6 will identify the requested data item is actually stored in the remote cache 9. The Get( ) command is routed to the remote cache 9 to retrieve the requested data item. The requested data item is routed to the local cache 120 via the remote cache 6 and the remote cache 1.

If the data item has never been stored, local cache 120 (see FIG. 5) of any of the remote caches 1–9, the Get( ) command will ultimately be forwarded to a content provider and stored in the appropriate cache. In the example above, if the requested data item was not present in the remote cache 9, the Get( ) command will be sent to the content provider and the retrieved data item will be forwarded to the client 102 and also stored in the remote cache 9 for future retrieval. This assumes that the flags associated with the Get( ) command and the MinRefCount values are appropriately set to permit storage of the requested data item in the remote cache 9. Thus, the system 100 permits storage and retrieval of data in a distributed cache system.

The mapping process and the use of Server Routing Objects to add remote caches have been discussed above with respect to the local cache 120. In addition, more remote caches may be added to the system at any of the levels L2–L4 to extend the distributed cache system. As new data caches are added to the system 100, the distribution of stored data items is balanced out in the manner described above.

Figure 14:
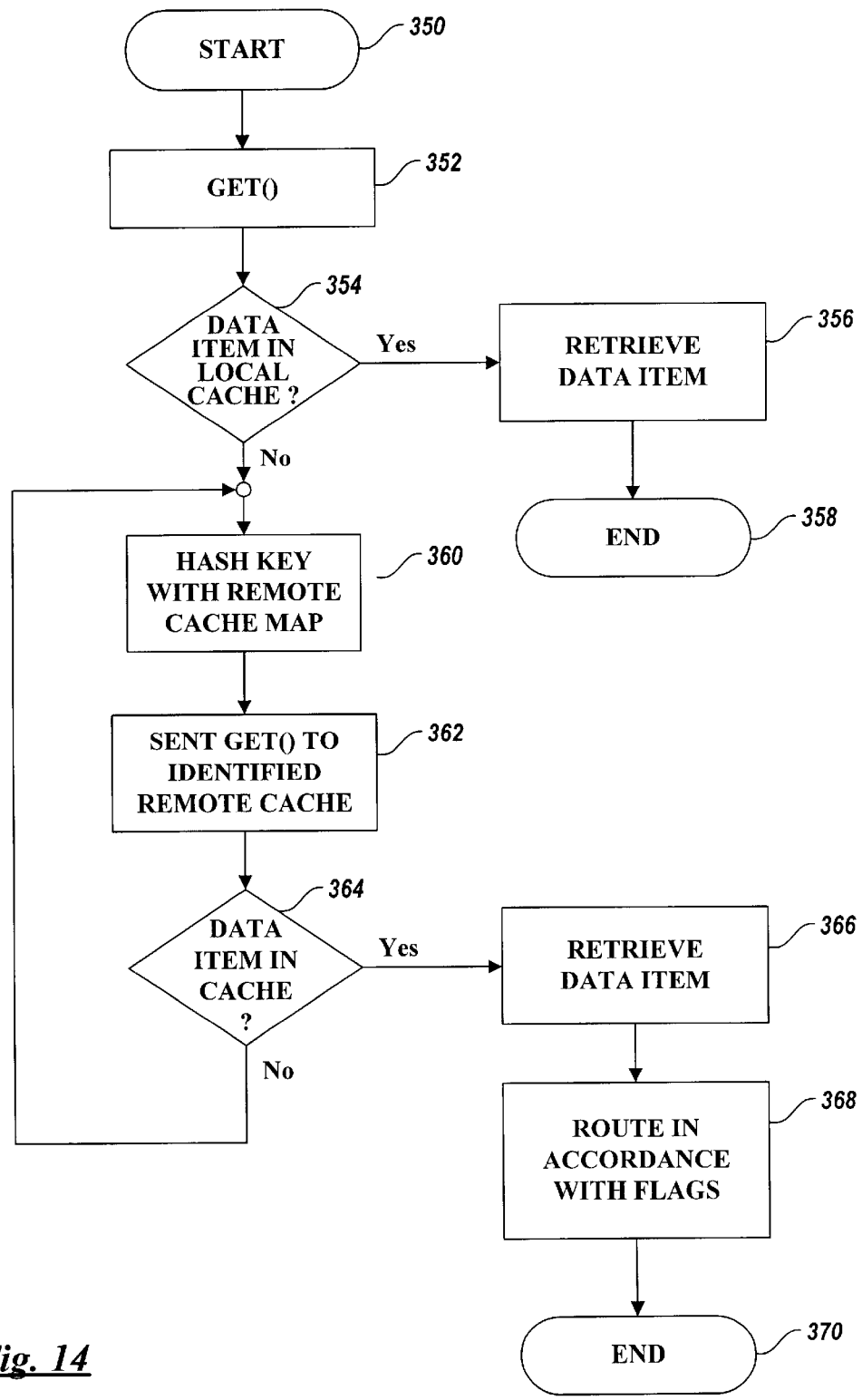
FIG. 14 is a flowchart illustrating the operation of the system to retrieve data items stored in different topological layers of the distributed cache array.

The process of retrieving data from remote caches at different levels, such as the remote caches 1–9 illustrated in FIG. 10, is illustrated in the flowchart of FIG. 14. At a start 350, it is assumed that all remote caches have been initialized and are operational. For the sake of clarity, it is further assumed that there are no newly added remote caches that require load balancing, which is illustrated in the flowcharts of FIGS. 12 and 13. In step 352, the client 102 (see FIG. 5) generates a Get( ) command to retrieve a requested data item. As noted above, the Get( ) command includes a key to uniquely identify the requested data item.

In decision 354, the system determines whether the requested data item is contained within the local cache 120 (see FIG. 5). If the requested data item is present in the local cache 120, the result of decision 354 is YES. The requested data item is retrieved from the local cache 120 in step 356 and the process ends at step 358.

If the requested data item is not in the local cache 120 (see FIG. 5), the result of decision 354 is NO. In that event, the system 100 hashes the key with the remote cache map (e.g., the map 156 of FIG. 11) in step 360 to determine the location of the requested data item. To assist in understanding of the distributed cache system, assume that the requested data item is physically stored within the remote cache 9, as described in the example above. However, the map 156 does not include the remote cache 9, but only includes the remote caches 1–4 at the layer L2. Only the remote caches 1–4 are accessible to the local cache 120 via the network connection 130. In the present example, the routing data 154 of FIG. 11 will identify the remote cache 1 as the location of the requested data item.

In step 362, the system 100 sends the Get( ) command to the identified remote cache (e.g., the remote cache 1). In decision 364, the remote cache 1 determines whether the requested data item is present within the remote cache. The process for determining the presence and location of a requested data item within a particular cache has been previously described. If the requested data item is present in the identified remote cache, the requested data item is retrieved in step 366 and routed in accordance with flags accompanying the Get( ) command in step 368. The process ends at step 370 with the requested data item having been retrieved from the identified remote cache.

In the example discussed above, where the requested data item is physically stored within the remote cache 9, the index table for the remote cache 1 will indicate that the data item is not present within the remote cache 1. If the requested data item is not present in the identified remote cache, the result of decision 364 is NO.

The system returns to step 360 with the remote cache 1 hashing the key with its own remote cache map (not shown). As described above, the remote cache 1 has its own remote cache configuration data, which identifies the remote caches 5 and 6 in the layer L3. Hashing the key with the remote cache map of the remote cache 1 will identify the remote cache 6 in the layer L3 as containing the requested data item. In step 362, the Get( ) command is sent from the remote cache I to the remote cache 6. In decision 364, the remote cache 6 determines whether the requested data item is present within the remote cache 6. In the example presented above, the requested data item is not present in the remote cache 6. Thus, the results of decision 364 is NO.

The system again returns to step 360 where the remote cache 6 hashes the key with its own remote cache map. As illustrated in FIG. 10, the remote cache 6 contains remote cache configuration data identifying the remote caches 8 and 9 in the layer L4. When the remote cache 6 performs step 360 and hashes the key with its own remote cache map, the remote cache 9 is identified as the remote cache containing the requested data item. In step 362, the remote cache 6 sends the Get( ) command to the identified remote cache (i.e., the remote cache 9).

In decision 364, the remote cache 9 determines whether the requested data items are present within the cache. In the example presented herein, the requested data item is present within the remote cache 9. In that event, the result of decision 364 is YES and the data item is retrieved in step 366. In step 368, the requested data item is routed in accordance with the flags accompanying the Get( ) command and the process ends at step 370. Thus, the client 102 initiated the Get( ) command and the distributed cache system routes the Get( ) command to the appropriate location in the distributed cache system where the data is stored.

Although the process described in detail herein involves many steps, the Get( ) commands are executed very quickly. Thus, the system 100 provides great flexibility in network topology, a distributed cache system that has enormous storage capacity, and the flexibility in adding remote servers at any layer. The process of adding a remote server at the L2 layer was described above with respect to FIGS. 10–13. Those skilled in the art can appreciate that remote caches may be added at any layer in the system. For example, an additional remote cache may be added at the layer L4 and configured for access by one or more of the remote caches (e.g., the remote caches 5–7) at the layer L3.

As noted above, some requested data items may not be present in any cache. The Get( ) command is ultimately routed to a content provider (e.g., the content provider 136 of FIG. 5) and the requested data item retrieved. When a requested data item is retrieved from a content provider, it will be routed and processed in accordance with the flags previously discussed. For example, the data may be stored within the local cache 120 (see FIG. 5) or not stored at all if the MinRefCount is greater than zero. Alternatively, the requested data item may be stored in a remote cache in the array of remote cache as illustrated in FIG. 10.

The system 100 uses the Put( ) command to store the requested data in the remote cache identified by the routing data 154 using the latest version of the map (e.g., the new map 156 of FIG. 11). For example, the routing data 154 of FIG. 11 may indicate that the requested data item is stored in the remote cache 4 of FIG. 109. If the requested data item is not present in the remote cache 4, the remote cache 4 may retrieve the requested data item from a content provider (e.g., the content provider 136 of FIG. 5). When the requested data item is retrieved, it will be routed and processed in accordance with the flags accompanying the Get( ) command. If the requested data item is to be stored in a remote cache, it will be stored in the remote cache 4 in this example because the routing data 154 (see FIG. 11) indicated that the requested data item was in the remote cache 4.

The operation of the system 100 to dynamically add remote caches has been described above. Remote caches can be dynamically removed from the system as well. The CCache object includes the RemoveRemoteCaches( ) command to remove any identified caches. The system 100 will generate a new map, similar to the map 156 of FIG. 11, but without identifying the servers (not shown) associated with any removed caches. In this embodiment, any data stored in the removed cache will be lost. Alternatively, it is possible to move data from a particular cache to other caches before removing the particular cache. All data may be moved from the particular cache, or only data with predetermined parameters, such as sticky data.

Figure 15:
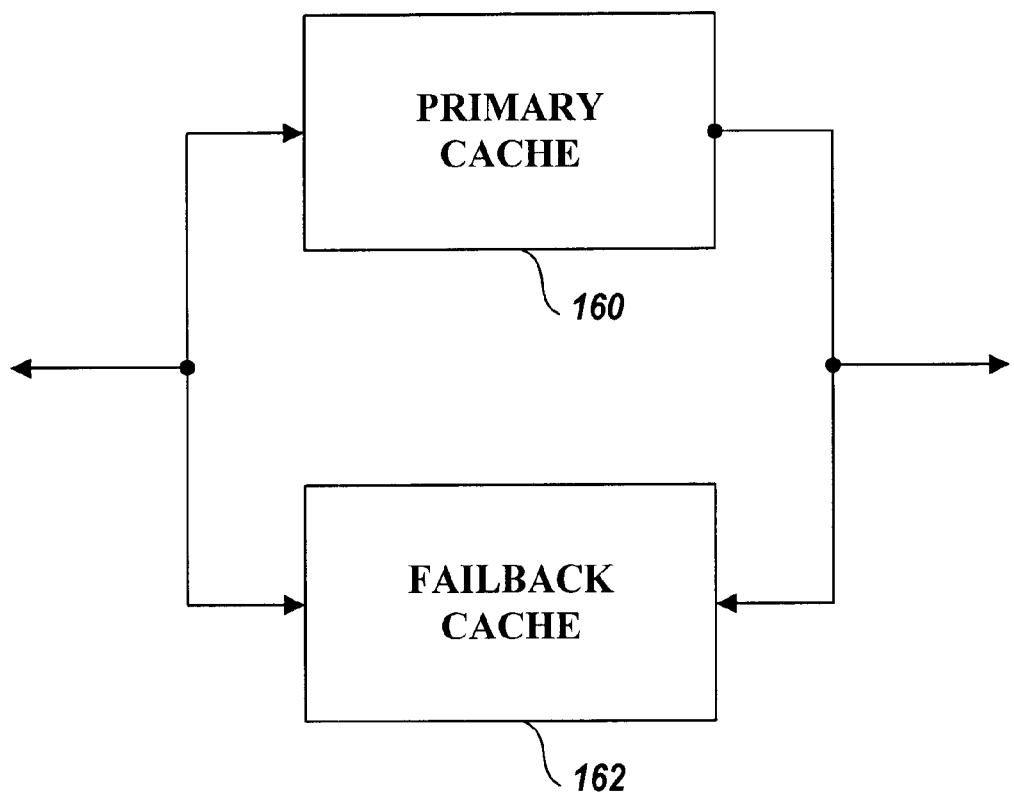
FIG. 15 is a functional block diagram illustrating the fault-tolerant operation of the distributed cache system.

The distributed cache system of the present invention also provides fault-tolerant operation through the use of redundant servers. Those skilled in the art can appreciate that many different fault-tolerant modes of operation can be provided. For example, two remote servers may be operated essentially in parallel such that their respective remote caches contain identical data. This is illustrated in FIG. 15 where a primary cache 160 and a failback cache 162 operate in a "mirror image" mode. In this example, all data stored on the primary cache 160 is also stored in identical fashion on the failback cache 162. All housekeeping functions are performed in parallel so that the data in primary cache 160 is identical to the data in failback cache 162. The servers (not shown) containing the primary cache 160 and failback cache 162 are designated as the primary and failback remote servers, respectively. The requested data items are retrieved from the primary cache 160 unless a failure occurs in the primary cache (or the corresponding remote server). In the event of the failure of the primary storage system, the failback cache 162 can take over and provide all requested data. Because the primary cache 160 and failback cache 162 contain identical data, there is no loss to the system and the switch to the failback cache (and failback server) are transparent to the remaining portions of the system. While such fault-tolerant operation provides complete redundancy, it does so at the expense of additional processor cycles and decreased storage capacity for the overall system since all data stored on the primary cache 160 must be duplicated on the failback cache 162.

As an alternative to complete redundancy, the system 100 can use an "almost mirrored" operational mode in which the primary cache 160 and failback cache 162 do not contain identical data, but contain nearly identical data. In this embodiment, data is retrieved and stored in the primary cache 160 and failback cache 162 in a "round-robin" fashion. For example, assume that both primary cache 160 and the failback cache 162 are both cold (i.e., contain no stored data items). The first time a data item is requested and stored it is stored, by way of example, in the primary cache 160. The next time a data item is requested, it will be stored in the failback cache 162. Repeated request for new data items result in the storage of data items alternately in the primary cache 160 and failback cache 162. If a particular data item is requested multiple times it will eventually be stored in both the primary cache 160 and failback cache 162.

For example, when a data item is requested the first time, it will be stored in, by way of example, the primary cache 160. The subsequent request for the same data item will result in its retrieval from the primary cache 160 if the remote cache map has identified the primary cache 160 as the location where the data item is stored. However, because of the round-robin selection process, the requested data item may subsequently be identified if stored in the failback cache 162. Since it is not actually present in the failback cache 162, it will be retrieved from the content provider (e.g., the content provider 136 of FIG. 5) and stored in the failback cache. In this manner, frequently requested data items will eventually end up being stored in both the primary cache 160 and failback cache 162. In contrast, infrequently requested data items may not be stored in both the remote caches. Thus, there may be some loss of data in the event of failure of one of the remote caches. Similarly, the housekeeping functions of the remote caches are performed independently and thus result in the elimination of some infrequently used data items. While the failure of a remote cache or server does result in the loss of some data, it is typically less frequently used data, which can be subsequently retrieved from the content provider (e.g., the content provider 136 in FIG. 5). However, frequently used data items will be stored in the primary cache 160 and the failback cache 162. This approach to fault-tolerant data storage provides increased utilization of resources by storing only frequently requested data items in both the primary and the failback remote caches. Those skilled in the art can appreciate that other forms of fault-tolerant operation may also be implemented by the system 100.

Techniques such as time limits and frequency limits can be employed by the system 100 to control storage of data items within the cache. As illustrated in Table 1, the local cache object allows the specification of a time limit array and frequency limit array to eliminate old or infrequently used data items. If a particular data item has exceeded its time storage limit, as specified in the time limit array, that data item is deleted from the cache. Similarly, if the average time between requests for a particular data item exceeds the frequency limit, as specified in the frequency limit array, that data item is deleted from the cache.

Figure 16:
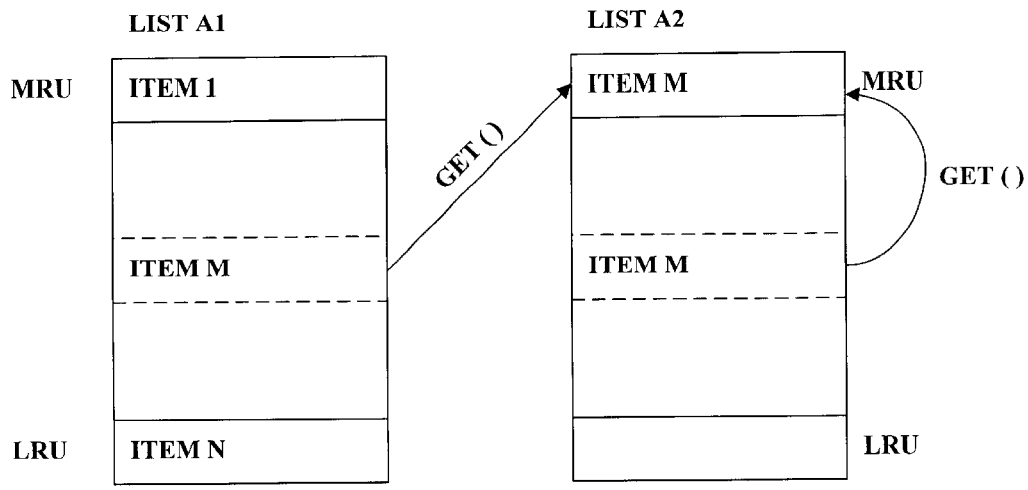
FIG. 16 is a functional block diagram illustrating the operation of the distributed cache system for deleting data items.

Under other circumstances, it may be necessary to make space for a new data item even if other data items have not exceeded their specified time limit or frequency limit criteria. Under these circumstances, the system can employ a least recently used (LRU) utilization list to delete data items from the cache. The LRU utilization list tracks storage and retrieval of data items in the cache and allows deletion of the LRU data items if additional space in the cache is required. For example, if a user wishes to limit the cache size based on the available memory (e.g., RAM), the system 100 can implement a set of LRU lists, such as illustrated in FIG. 16. Each instance of the CLocalCache object on the client 102 (see FIG. 5) and on each of the servers 122–126 implements its own set of LRU lists and functions independently to control its own cache (e.g., the local cache 120 and the remote caches 1–3, respectively).

When a data item is placed in the cache by a Put( ) command, a data pointer to that data item is entered into a list A1 at a location indicating that it is the most recently used file. Although the data item itself could be entered into list A1, the system 100 implements the LRU list using pointers to the actual location of each data item within the cache. In the example illustrated in FIG. 16, a utilization list A1 contains data items 1-N, which indicate the sequence with which data items were stored in the data cache by Put( ) commands. For the sake of convenience, the data in the lists of FIG. 16 are shown as data items. In a practical implementation the data in the utilization lists are pointers to the actual data items. In an exemplary embodiment, the data pointers are stored sequentially in a sequence indicative of the order in which the items were stored in the data cache. Other alternatives, such as a time stamp or the like, may also be used to indicate the sequence in which data items were stored within the cache. In the example illustrated in FIG. 16, the data in the list A1 is sequentially ordered from the most recently used (MRU) to the least recently used (LRU) data items. Those skilled in the art will recognize that the utilization lists and the data therein need not occupy a contiguous block of memory in the RAM 25 (see FIG. 1). Each data pointer (e.g., the Item M) may include pointers to the previous entry in the list and to the next entry in the list, in a manner well known in the art.

If a particular data item, such as Item M is retrieved from the data cache by a Get( ) command, the pointer for that data item is moved from the list A1 to a list A2. The pointers for items in the list A2 indicate the sequence with which data items were retrieved from the cache using a Get( ) command. In the example illustrated in FIG. 16, the data pointers in the list A2 are stored sequentially in a manner indicative of the sequence with which the data items were. retrieved from the cache using the Get( ) command. Similarly, if a data item whose pointer is already contained within the list A2 is subsequently retrieved from the cache using the Get( ) command, the data pointer for that item is moved within list A2 to indicate that it is now the MRU data item. Using the list A1 and the list A2 illustrated in FIG. 16, it is possible to prioritize the data items within the cache based on how recently each data item was used.

If it becomes necessary to delete a data item from the cache, the system 100 will delete the LRU item in list A1. In the example illustrated in FIG. 16, the Item N is the least recently used item in list A1 and has never been retrieved from the data cache. As noted above, the data pointer is moved from list A1 to list A2 if the corresponding data item is retrieved from the data cache by the Get( ) command. Thus, the data Item N may be deleted from the cache as the most expendable data item based on its low frequency of use. If additional data items must be deleted the cache controller (e.g., the cache controller 116 of FIG. 5) will delete the next LRU data items in the list A1.

Figure 17:
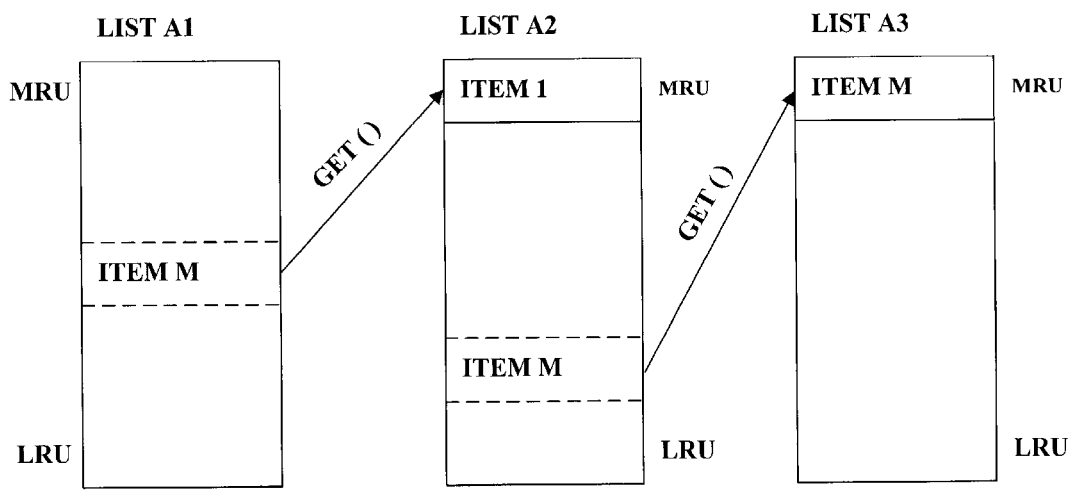
FIG. 17 is a functional block diagram illustrating the use of multiple lists for prioritization of the removal of data items from a data cache.

If the list A1 contains no data pointers (i.e., all data items stored in the cache have been retrieved using the Get( ) command), the system 100 will delete the least recently used (LRU) item from the list A2. This concept may be extended beyond two lists with each successive list containing data pointers corresponding to higher priority data items based on the frequency of retrieval using the Get( ) command. This is illustrated in FIG. 17 where a list A3 receives data pointers from the list A2. Each time a data item is retrieved from the cache using a Get( ) command, the data pointer corresponding to that data item is moved to a successive utilization list until the data pointer is moved to the last list in the sequence. Thereafter, the data pointer for the data item will be moved to the MRU location within the last list in the sequence each time the corresponding data item is retrieved from the cache.

In the example illustrated in FIG. 17, a data pointer corresponding to the Item M is stored in list A1 in response to a Put( ) command storing the data item within the data cache. When the Item M is retrieved from the data cache using the Get( ) command, the corresponding data pointer is transferred from the list A1 to the list A2. If the data item is subsequently retrieved a second time from the data cache, the corresponding data pointer is moved from the list A2 to a list A3. This concept may be extended to additional lists (not shown). Each successive list contains data pointers corresponding to data items that are considered higher priority based on their frequency of retrieval. If the system 100 must delete data items from the cache, it will start from the LRU items in the lowest priority utilization list (e.g., the list A1). If the list A1 is empty, the system 100 will delete the LRU data item from the next successive list (e.g., the list A2) and so forth. With this technique, the system 100 is more likely to delete unnecessary or old data items while more frequently used or recently used data items are retained within the cache.

FIGS. 16 and 17 illustrate the use of LRU lists, which may operate satisfactorily for a small number of users. However, in the distributed data cache of the system 100, a large number of users may simultaneously access various portions of the data cache. As previously discussed, the distributed data cache of the system 100 can accommodate hundreds of users simultaneously retrieving data items from the data cache. Each of these independent operations is sometimes designated as a "thread." Those skilled in the art can appreciate that the use of a single set of LRU lists, such as illustrated in FIGS. 16 and 17, may be inadequate for a large number of threads. If a large number of users are storing data items in the cache and retrieving data items from the cache, the system 100 must sequentially update the utilization lists (e.g., the lists A1–A3), which may load to a significant reduction in the speed of the system.

Figure 18:
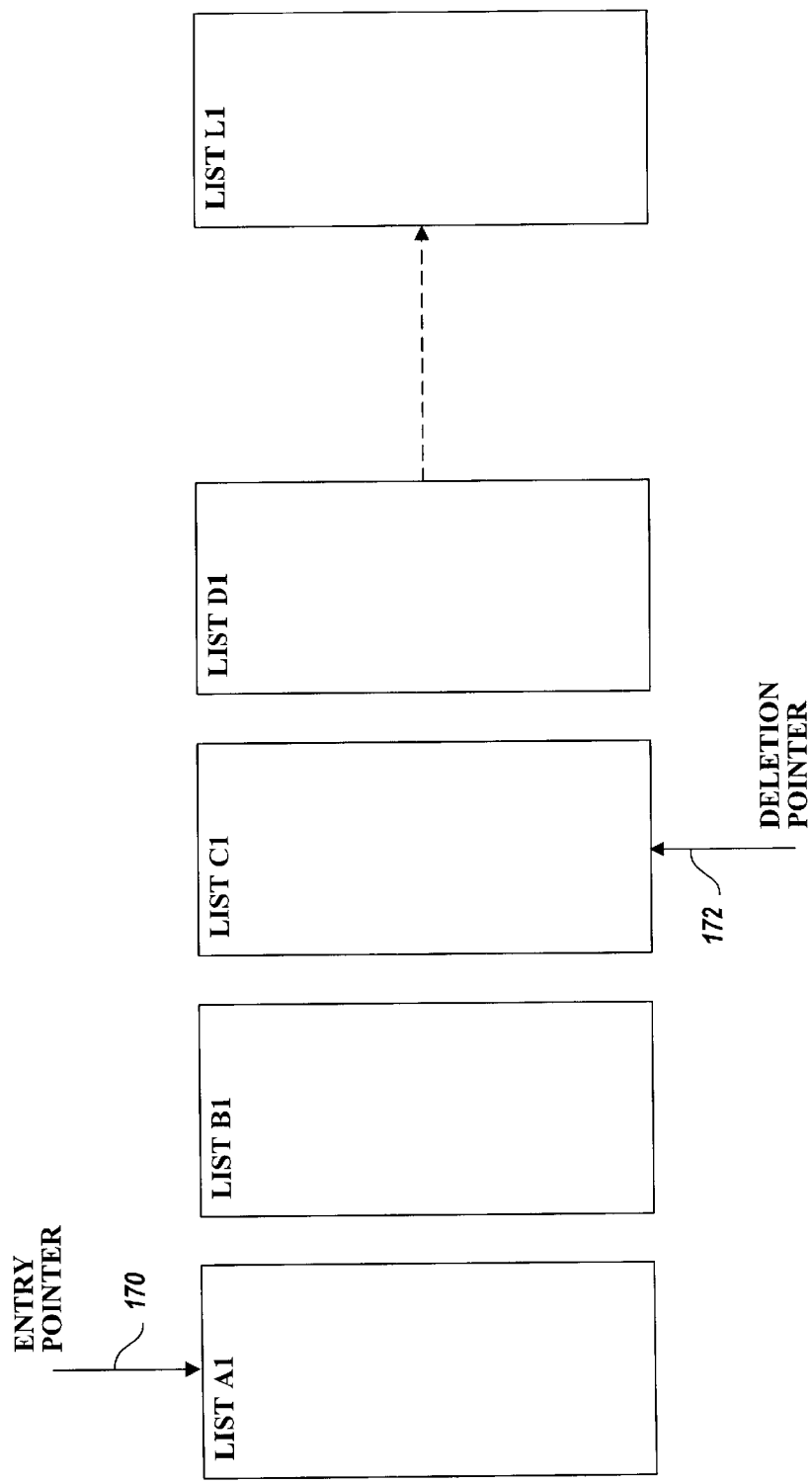
FIG. 18 is a functional block diagram illustrating the operation of the distributed cache system for deleting data items using a plurality of utilization lists to accommodate different user threads.

The LRU lists illustrated in FIG. 18 form a "cluster" of lists that may be used by the local cache 120 (see FIG. 5) to alleviate the bottleneck that may result from a large number of users accessing the cache.

FIG. 18 illustrates a number of LRU lists, designated as list A1–list L1. The list A1 in FIG. 18 corresponds to the list A1 in FIGS. 16 and 17. Although not illustrated in FIG. 18, the system 100 also may include the lists A2, A3, etc. coupled to the list A1 and operating in the manner described above.

Similarly, the lists B1–L1 of FIG. 18 each independently replicate the functionality of the list A1. That is, each list independently performs the function of the list A1 as described above with respect to FIGS. 16 and 17. In addition, each of the lists B1–L1 may also include multiple lists, such as lists B2–L2 (not shown). It should be noted that the lists A1–L1 need not have the same number of higher priority utilization lists associated therewith. For example, the list A1 may have associated lists A2–A3, while the list B1 may only have an associated list B2. The system 100 can accommodate any variable number of lists associated with the lists A1–L1.

In an exemplary embodiment, the system 100 provides more sets of utilization lists than the maximum number of threads expected to access the data cache. In a typical system, L≅50 for each instance of the local cache both in the client 120 (see FIG. 5) and each remote server 122–126. With a single set of utilization lists, as shown in FIGS. 16–17, the system 100 must access the utilization lists in a serial fashion thus decreasing the overall speed. However, with a large number of sets of utilization lists as illustrated in the example of FIG. 18, the system 100 can access the utilization lists in a parallel fashion and thereby provide the advantage of LRU lists without a loss of speed. Thus, the plurality of LRU lists may be thought of as a software cluster, which is analogous to a hardware cluster that provides distributed data processing functionality.

The entry of data pointers in the software cluster of LRU lists occurs independently of the deletion of data pointers and the corresponding data item from the cache. The system 100 includes an entry pointer 170, which is illustrated in FIG. 18 as presently indicating or selecting the list A1. When a data item is stored in the data cache using a Put( ) command, the corresponding data pointer is entered into one of the lists A1–L1 which is currently selected by the entry pointer 170. In the example illustrated in FIG. 18, the data pointer is entered into the list A1 since the entry pointer 170 is currently selecting the list A1. After storing the item, the system increments or alters the entry pointer 170 to select the next list (e.g., the list B1). The term "increment" is intended to describe the process of selecting the next one of the sets of utilization lists. Those skilled in the art will appreciate that the particular data processing steps to select the next set of utilization lists can be accomplished by a variety of known techniques. The next time any data item is stored in the cache with the Put( ) command, the corresponding data pointer is entered into the list B1 and the entry pointer 170 is incremented. Each subsequent entry of a data item using the Put( ) command will cause the cache controller (e.g., the cache controller 116 of FIG. 5) to enter the corresponding data pointer into the next sequential LRU list (i.e., the lists A1–L1).

When data items are put in the cache (e.g., the local cache 120 in FIG. 5), corresponding data pointers are stored in sequential ones of the utilization lists A1–L1. Whenever a data item is retrieved by a Get( ) command, the data pointer corresponding to that data item is moved from its respective utilization list to a higher priority utilization list or moved to an MRU location within the same utilization list in the manner discussed above with respect to FIGS. 16–17. For example, if the data pointer was originally stored in the list A1, a subsequent retrieval of the data item by a Get( ) command will result in the corresponding data pointer being moved from the list A1 to the list A2 in the manner described above with respect to FIG. 16 and FIG. 17. Alternatively, the corresponding data pointer may be moved to the MRU location within the same LRU list, as illustrated in FIG. 16. Similarly, if the data pointer was originally stored in another utilization list (e.g., the list C1), the data pointer would be moved to a higher priority list (e.g., the list C2, not shown) when the data item is retrieved from the cache by a Get( ) command.

The deletion process operates independently of the data entry process. The cache controller (e.g., the cache controller 116 of FIG. 5) will delete a data item from the cache based on the utilization list selected by a deletion pointer 172. In the example of FIG. 18, the deletion pointer 172 is selecting the list C1. If it is necessary to delete a data item, the cache controller (e.g., the cache controller 116) will delete the LRU data item corresponding to the LRU data pointer in the utilization list selected by the deletion pointer 172 (e.g., the list C1). The cache controller 116 uses the various LRU lists associated with the list C1 (e.g., a list C2, C3, etc., not shown) in the manner described above with respect to FIGS. 16 and 17. That is, a data item is deleted corresponding to the LRU data pointer in the lowest priority utilization list (e.g., the list C1). If no data pointers are present in the low priority list (e.g., the list C1),.the system 100 will delete the LRU item using the next highest priority list (e.g., the list C2, not shown). After the LRU data item is removed from the cache, the deletion pointer 172 is altered to point to the next utilization list (e.g., the list D1). The next time a data item is to be deleted from the cache, the data item will be selected based on the LRU data pointer in the list D1. Thus, the cache controller (e.g., the cache controller 116 of FIG. 5) will delete data items that are indicated as the LRU data items in successive ones of the utilization lists (e.g., the lists A1–L1).

Thus, a large number of utilization lists can readily accommodate a large number of threads. Although two threads cannot simultaneously access a given utilization list (e.g., the list A1), the large number of utilization lists increases the likelihood that a given list will be available. The independent insertion and deletion processes allow independent optimization of each process.

As previously noted, the deletion of data items need not occur unless the cache is nearly full. In that case, the deletion process can delete one or more of the LRU data items from the cache to make room for a new data item. It may be necessary to delete multiple data items from the list in order to accommodate the insertion of one new data item. For example, if three data items must be deleted from the cache to accommodate the insertion of one new data item, the deletion pointer 172 is altered following the deletion of each data item such that the deletion pointer 172 points to three different utilization lists to delete three different data files.

Figure 19:
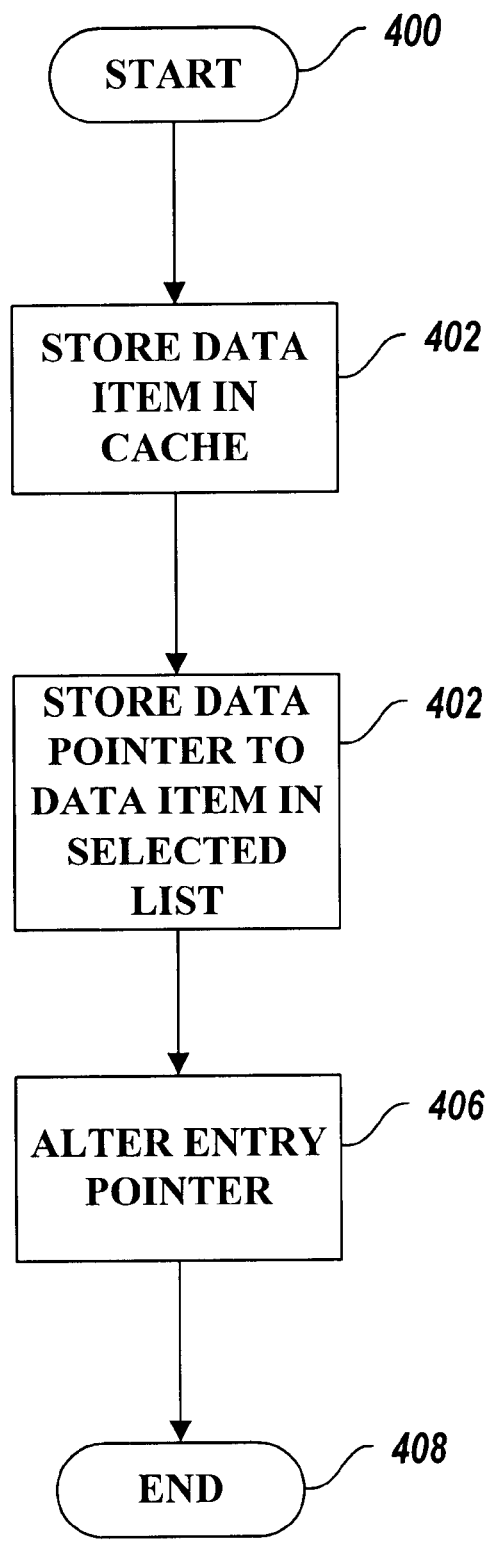
FIG. 19 is a flowchart illustrating the operation of the system for prioritization of data items using the utilization lists of FIG. 18.

The flowchart of FIG. 19 illustrates the operation of the system 100 when using multiple utilization lists, such as those illustrated in FIG. 18. As noted above, the utilization lists of FIG. 18 are implemented by each cache (e.g., the local cache 120 and each of the remote caches 1–3 of FIG. 5) and may be satisfactorily implemented within a single cache or a distributed cache system. At a start 400, the data cache has been initialized and is ready to accept data. In step 402, the system 100 stores a data item within the cache. In an exemplary embodiment, the data item may be stored using a Put( ) command using the universal data structures discussed above.

In step 404, the system 100 stores a data pointer to the data item in a selected list. The selected list is the utilization list selected by the entry pointer 170 (see FIG. 18). In the example of FIG. 18, the entry pointer is currently indicating the list A1. Thus, in this example, operation of step 404 would result in the data pointer being stored in the list A1. In step 406, the system 100 alters the entry pointer 170 to indicate the next sequential list of utilization lists. In an exemplary embodiment, the entry pointer may simply be incremented to indicate the next sequential utilization list. In the example of FIG. 18, the entry pointer 170 will point to the list B1 following the operation of step 406. The operation is complete and the system ends at step 408. Thus, each time a data item is stored within the data cache, one of the plurality of utilization lists is selected and a data pointer to that data item is stored within the selected one of the utilization lists.

As noted above, the purpose of the utilization lists is to determine which data items are the least recently used (i.e., the oldest unutilized data item). When a data item is retrieved from the cache, the corresponding data pointer is altered or moved to indicate that the data item has been recently used (i.e., the most recently retrieved data item is the MRU data item). The data pointer corresponding to the retrieved data item may be moved to a different utilization list (e.g., the utilization list A2 as illustrated in FIGS. 16 and 17) or moved from one part of a list to a different portion of the same list to indicate that it is the MRU data item (as illustrated in FIG. 16). As data items are stored and retrieved from the data cache, the utilization lists are altered to reflect the sequence of activity such that MRU data items will not be deleted and LRU data items will be deleted from the cache as necessary.

Figure 20:
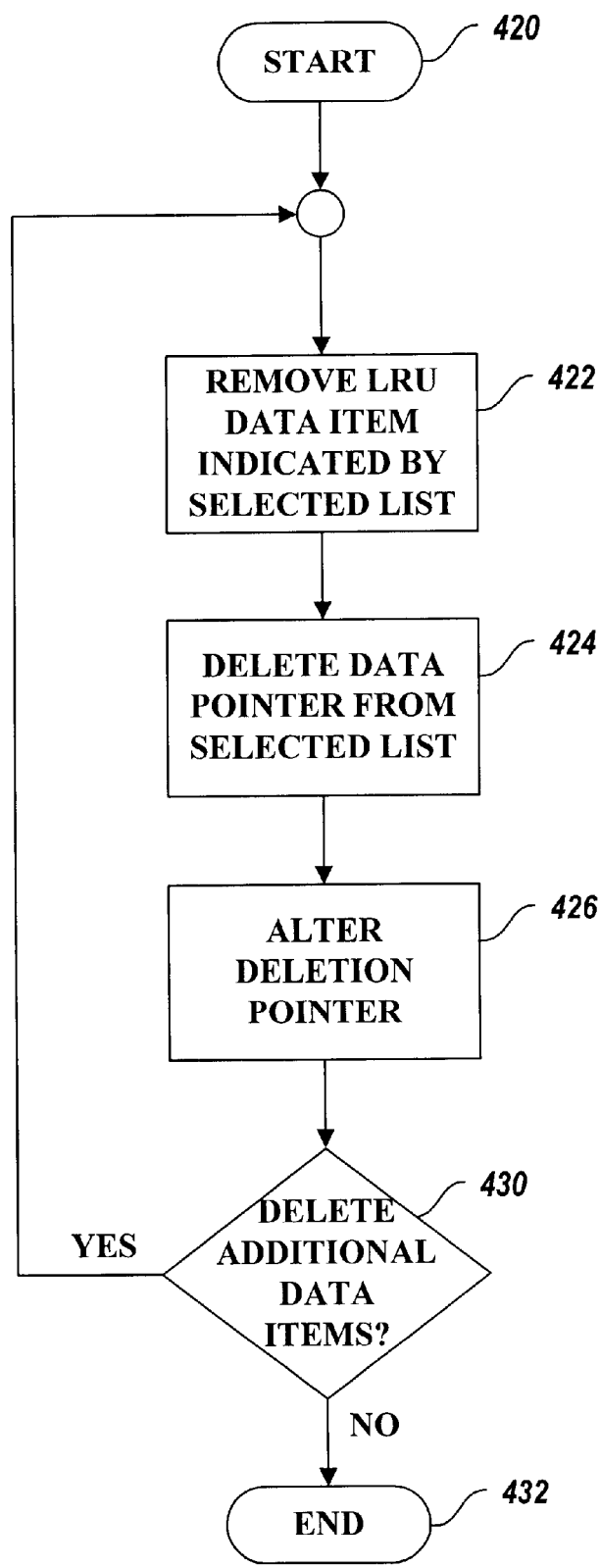
FIG. 20 is a flowchart illustrating the operation of the distributed cache system for deleting data items using the utilization lists of FIG. 18.

The use of the utilization lists to delete data items from the cache is illustrated in the flowchart of FIG. 20. At a start 420, it is assumed that a number of data items have been stored in the data cache and it is necessary to delete one or more data items from the cache. In step 422, the system removes the LRU data item based on the LRU data pointer in the utilization list selected by the deletion pointer 172 (see FIG. 18). As previously noted, the entry of data into the utilization list and the deletion of data from the utilization list are independent operations. Thus, the entry pointer 170 and the deletion pointer 172 may point to different utilization lists, such as illustrated in FIG. 18.

When an LRU data item is deleted from the cache in step 422, the corresponding data pointer in the selected utilization list is also deleted in step 424. In step 426, the system alters the deletion pointer 172 (see FIG. 18) to indicate the next sequential one of the plurality of utilization lists. As noted above with respect to the entry pointer 170, the deletion pointer 172 may be incremented to point to the next sequential utilization list. Alternatively, the deletion pointer 172 may be altered in any conventional manner to point to a different one of the plurality of utilization lists.

In decision 430, the system determines whether additional data files must be deleted. As noted above, the storage of a new data item may require the deletion of more than one existing data items from the cache. If additional data items must be deleted to accommodate the new data item, the result of decision 430 is YES. In that event, the system returns to step 422 to eliminate additional LRU data items. If the deletion of additional data items is unnecessary, the result of decision 430 is NO. In that event, the system ends the process at step 432. Thus, each cache in the distributed cache system may independently control the storage of data within its own cache. The use of utilization lists helps assure that MRU data items are not deleted and that LRU data items are deleted if necessary.

From the foregoing it will be appreciated that, although specific embodiments of the invention have been described herein for purposes of illustration, various modifications may be made without deviating from the spirit and scope of the invention. For example, the invention may be expanded to a large number of remote servers coupled together in multiple different hierarchical configurations to provide a distributed caching system. Accordingly, the invention is not limited except as by the appended claims.

What is claimed is:

1. a system for multi-threaded data caching comprising:
   a computer platform;
   a data structure associated with the computer platform to store data;
   a plurality of first utilization lists associated with the data structure, each of the plurality of first utilization lists containing utilization data associated with a portion of the data items stored within the data structure, the utilization data for each of the plurality of first utilization lists indicating a sequence in which the respective portions of associated data items are stored within the data structure;
   a first indicator to indicate a selected one of the plurality of first utilization lists that will store the utilization data for the associated data item;

a second indicator to indicate a selected one of the plurality of first utilization lists; and a cache controller associated with the data structure to delete data items from the data structure, the cache controller deleting a data item associated with utilization data in the selected one of the plurality of first utilization lists indicated by the second indicator.

2. The system of claim 1 wherein the cache controller deletes data items in a sequence in which the corresponding utilization data is entered into the selected first utilization list indicated by the first indicator, the data item being designated as a least recently used (LRU) data item in the selected first utilization list indicated by the second indicator being deleted from the data structure.

3. The system of claim 1 wherein the first and second indicators indicate different selected ones of the plurality of first utilization lists.

4. The system of claim 1 wherein the cache controller alters the first indicator following storage of a data item to indicate a different selected one of the plurality of first utilization lists.

5. The system of claim 1 wherein the cache controller alters the second indicator following deletion of a data item to indicate a different selected one of the plurality of first utilization lists.

6. The system of claim 1 for use in a multi-threaded environment in which the data structure is responsive to a predetermined plural number of processing threads which store data items in the data structure and which retrieve data items from the data structure, the plurality of first utilization lists being greater in number than the predetermined number of processing threads.

7. The system of claim 1, further comprising:

a second utilization list associated with the data structure and a predetermined one of the plurality of first utilization lists, the second utilization list containing a portion of the utilization data from the predetermined first utilization list, the portion of utilization data in the second utilization list indicating a sequence in which the portions of associated data items are retrieved from the data structure.

8. The system of claim 7 wherein the cache controller deletes a data item from the data structure based on the predetermined first utilization list and the second utilization list.

9. The system of claim 7 wherein the cache controller deletes a data item from the data structure based on the predetermined first utilization list, the cache controller deleting the data item corresponding to a least recently used (LRU) utilization data within the first utilization list.

10. The system of claim 9 wherein the cache controller deletes a data item from the data structure corresponding to a least recently used (LRU) utilization data within the second utilization list if the first utilization list contains no utilization data.

11. The system of claim 1 wherein the utilization data comprises a pointer to a location in the data structure where the corresponding data item is stored.

12. The system of claim 11 wherein the data item comprises a pointer to a location in a selected one of the plurality of utilization lists where the corresponding utilization data is stored.

13. A system for distributed data caching comprising:

a first computer platform;

a first data structure associated with the first computer platform to store data;

a plurality of remote computer platforms separate from the first computer platform and coupled to the first computer platform;

a remote data structure associated with each of the plurality of remote computer platforms to store data;

a plurality of first utilization lists associated respectively with the first data structure and each of the remote data structures, each first utilization list containing data associated with corresponding data items stored within the respective data structure, wherein the data contained in each first utilization list indicates a sequence in which the data items were stored within the respective data structure;

a plurality of second utilization lists associated respectively with the first data structure and each of the remote data structures, each second utilization list containing data associated with corresponding data items stored within the respective data structure, wherein the data contained in each second utilization list indicates a sequence in which the data items were retrieved from the respective data structure, and wherein utilization data in the second utilization list is removed from the first utilization list; and a cache controller associated with the first data structure and each of the remote data structures, respectively, the cache controller deleting data items from the respective data structures.

14. The system of claim 13 wherein the cache controllers delete data items from the respective data structures based on the first and second utilization lists associated with the respective data structures.

15. The system of claim 13 wherein the cache controllers delete data items from the respective data structures based on the first utilization list, the cache controller deleting data items corresponding to a least recently used (LRU) utilization data within the first utilization list.

16. The system of claim 15 wherein the cache controllers delete data items from the respective data structures corresponding to a least recently used (LRU) utilization data within the second utilization list if the first utilization list contains no utilization data.

17. The system or claim 13, further comprising a plurality of third utilization lists associated respectively with the first data structure and each of the remote data structures, the third utilization list containing utilization data associated with corresponding data items stored within the respective data structure, the third utilization list data indicating a sequence in which the data items whose utilization data is contained within the respective second utilization list were retrieved from the respective data structure wherein utilization data in the third utilization list is removed from the second utilization list.

18. The system of claim 13 wherein first utilization data is entered into the respective first utilization list when the corresponding first data item is initially stored in the respective data structure.

19. The system of claim 13 wherein second utilization data is entered into the respective first utilization list when the corresponding second data item is initially stored in the respective data structure, the first utilization data being altered to indicate a time of storage of the corresponding first data item earlier than the corresponding second data item.

20. The system of claim 13 wherein the utilization data is stored in a sequence indicative of the a time of storage of the corresponding data item.

21. The system of claim 13 wherein the cache controller executes a first retrieve command to retrieve a corresponding first data item from a selected one of the data structures, the utilization data corresponding to the retrieved first data item being placed on the second utilization list associated with the selected data structure and being removed from the first utilization list.

22. The system of claim 21 wherein the cache controller executes a second retrieve command to retrieve a corresponding second data item from the selected data structure, second utilization data corresponding to the retrieved second data item being placed on the second utilization list associated with the selected data structure and being removed from the first utilization list, the first utilization data being altered to indicate a time of retrieval of the corresponding first data item earlier than the corresponding second data item.

23. The system of claim 13 wherein the utilization data comprises a pointer to a location in the respective data structure where the corresponding data item is stored.

24. A computer-readable media containing a plurality of computer instructions to cause one or more computers to:
 designate a data structure associated with a computer platform to store data;
 associate a plurality of first utilization lists with the data structure;
 designate a selected one of the plurality of first utilization lists using a first indicator;
 upon storage of a data item within the data structure, store utilization data associated with the stored data item in the first utilization list indicated by the first indicator, the utilization data indicating a sequence in which the corresponding data items are stored within the data structure;
 designate a selected one of the plurality of first utilization lists using a second indicator; and
 delete from the data structure a data item associated with utilization data in the first utilization list indicated by the second indicator.

25. The computer-readable media of claim 24 wherein deletion of a data item is based on a sequence in which the corresponding utilization data is entered into the first utilization list indicated by the first indicator, the data item being designated as a least recently used (LRU) data item in the first utilization list indicated by the second indicator being deleted from the data structure.

26. The computer-readable media of claim 24 wherein the first and second indicators indicate different selected ones of the first utilization lists.

27. The computer-readable media of claim 24, further comprising computer instructions to alter the first indicator following storage of the data item to designate a different selected one of the plurality to first utilization lists.

28. The computer-readable media of claim 24, further comprising computer instructions to alter the second indicator following deletion of the data item to designate a different selected one of the plurality of first utilization lists.

29. The computer-readable media of claim 24, further comprising a plurality of computer instructions to:
 associate a second utilization list with the data structure and a predetermined one of the plurality of first utilization lists; and
 upon retrieval of a data item, whose utilization data is present in the predetermined first utilization list, from the data structure, store corresponding utilization data in the second utilization list.

30. The computer-readable media of claim 29, further comprising computer instructions to remove the corresponding utilization data from the first utilization list upon retrieval of the data item whose utilization data is present in the predetermined first utilization list.

31. The computer-readable media of claim 29 wherein deleting a data item from the data structure is based on the predetermined first utilization list and the second utilization list.

32. The computer-readable media of claim 29 wherein deletion of a data item from the data structure is based on the predetermined first utilization list by deleting the data item corresponding to a least recently used (LRU) utilization data within the first utilization list indicated by the second indicator.

33. The computer-readable media of claim 32 wherein deletion of a data item comprises deleting a data item from the data structure corresponding to a least recently used (LRU) utilization data within the second utilization list if the first utilization list indicated by the second indicator contains no utilization data.

34. The computer-readable media of claim 24 wherein the utilization data comprises a pointer to a location in the data structure where the corresponding data item is stored and the act of deleting a data item uses the pointer.

35. A method of using a computer network for multi-threaded data caching comprising:
 designating a data structure associated with a computer platform to store data;
 associating a plurality of first utilization lists with the data structure;
 designating a selected one of the plurality of first utilization lists using a first indicator;
 upon storage of a data item within the data structure, storing utilization data associated with the stored data item in the first utilization list indicated by the first indicator, the utilization data indicating a sequence in which the corresponding data items are stored within the data structure;
 designating a selected one of the plurality of first utilization lists using a second indicator; and
 deleting from the data structure a data item associated with utilization data in the first utilization list indicated by the second indicator.

36. The method of claim 35 wherein deletion of a data item is based on a sequence in which the corresponding utilization data is entered into the first utilization list selected using the first indicator, the data item being designated as a least recently used (LRU) data item in the first utilization list indicated by the second indicator being deleted from the data structure.

37. The method of claim 35 wherein the first and second indicators indicate different selected ones of the first utilization lists.

38. The method of claim 35, further comprising altering the first indicator following storage of the data item to designate a different selected one of the plurality of first utilization lists.

39. The method of claim 35, further comprising altering the second indicator following deletion of the data item to designate a different selected one of the plurality of first utilization lists.

40. The method of claim 35, further comprising:
 associating a second utilization list with the data structure and a predetermined one of the plurality of first utilization lists; and
 upon retrieval of a data item whose utilization data is present in the predetermined first utilization list, storing corresponding utilization data in the second utilization list.

41. The method of claim 40, further comprising removing the corresponding utilization data from the first utilization list upon retrieval of the data item whose utilization data is present in the predetermined first utilization list.

42. The method of claim 40 wherein deleting a data item from the data structure is based on the predetermined first utilization list and the second utilization list.

43. The method of claim 40 wherein deletion of a data item from the data structure is based on the predetermined first utilization list by deleting the data item corresponding to a least recently used (LRU) utilization data within the first utilization list selected by the second indicator.

44. The method of claim 43 wherein deletion of a data item comprises deleting a data item from the data structure corresponding to a least recently used (LRU) utilization data within the second utilization list if the first utilization list contains no utilization data.

45. The method of claim 35 wherein the utilization data comprises a pointer to allocation in the data structure where the corresponding data item is stored and the act of deleting a data item uses the pointer.

* * * * *

UNITED STATES PATENT AND TRADEMARK OFFICE
CERTIFICATE OF CORRECTION

PATENT NO. : 6,449,695 B1
DATED : September 10, 2002
INVENTOR(S) : Alexandre Bereznyi and Sanjeev Katariya It is certified that error appears in the above-identified patent and that said Letters Patent is hereby corrected as shown below:

Column 50,
Line 4, "allocation" should read -- a location --

Signed and Sealed this

Twenty-fifth Day of February, 2003

JAMES E. ROGAN
*Director of the United States Patent and Trademark Office*